(12) United States Patent
Buffington

(10) Patent No.: US 11,993,826 B2
(45) Date of Patent: May 28, 2024

(54) ALKALINE OXIDATION METHODS AND SYSTEMS FOR RECOVERY OF METALS FROM ORES

(71) Applicant: Hycroft Mining Corporation, Denver, CO (US)

(72) Inventor: Randy Buffington, Elko, NV (US)

(73) Assignee: Hycroft Mining Holding Corporation, Denver, CO (US)

( * ) Notice: Subject to any disclaimer, the term of this patent is extended or adjusted under 35 U.S.C. 154(b) by 330 days.

(21) Appl. No.: 16/412,368

(22) Filed: May 14, 2019

(65) Prior Publication Data

US 2019/0376158 A1 Dec. 12, 2019

Related U.S. Application Data

(60) Provisional application No. 62/671,995, filed on May 15, 2018, provisional application No. 62/747,120, filed on Oct. 17, 2018.

(51) Int. Cl.
| | |
|---|---|
| *C22B 1/11* | (2006.01) |
| *C22B 3/00* | (2006.01) |
| *C22B 3/02* | (2006.01) |
| *C22B 11/00* | (2006.01) |
| *C22B 15/00* | (2006.01) |

(52) U.S. Cl.
CPC ............ *C22B 1/11* (2013.01); *C22B 3/02* (2013.01); *C22B 11/04* (2013.01); *C22B 15/0076* (2013.01); *C22B 15/008* (2013.01)

(58) Field of Classification Search
CPC ... C22B 11/04; C22B 15/0076; C22B 15/008; C22B 1/11; C22B 3/02; C22B 3/12

USPC .......... 266/101, 114, 168; 75/744, 739, 711, 75/723, 741, 736, 733

See application file for complete search history.

(56) References Cited

U.S. PATENT DOCUMENTS

| | | | | |
|---|---|---|---|---|
| 4,017,309 | A | * | 4/1977 | Johnson .................... C22B 3/06 299/5 |
| 4,552,589 | A | | 11/1985 | Mason |
| 4,578,163 | A | | 3/1986 | Kunter |
| 4,941,917 | A | | 7/1990 | Cenegy |
| 4,961,777 | A | * | 10/1990 | Perez ...................... C22B 11/08 75/313 |
| 4,980,134 | A | | 12/1990 | Butler |
| 5,030,279 | A | * | 7/1991 | Krauth ...................... C22B 3/02 75/712 |

(Continued)

OTHER PUBLICATIONS

Oct. 10, 2019, WIPO, PCT/US19/32310 Search Report.

(Continued)

*Primary Examiner* — Jessee R Roe
*Assistant Examiner* — Michael Aboagye
(74) *Attorney, Agent, or Firm* — Glen P. Belvis; Belvis Law, LLC.

(57) ABSTRACT

An oxidation step for sulfide and transition ores prior to CN leaching to recover 60 to 90 percent of metals from those ores. Use of tona, soda ash or carbonate source in treating sulfide and transition ores for CN leaching recovery of metals, including gold and silver. The oxidation of sulfide and transition ores in the presence of carbonate. Low moisture content in the heap, to enhance available oxygen, during the oxidation of sulfide and transition ores in the presence of carbonate.

27 Claims, 15 Drawing Sheets

Simplified Process Flow Diagram for the Hycroft Process Facility

(56) References Cited

U.S. PATENT DOCUMENTS

| | | | |
|---|---|---|---|
| 5,236,492 A * | 8/1993 | Shaw | C22B 1/00 75/744 |
| 5,256,189 A | 10/1993 | Patel | |
| 5,354,359 A * | 10/1994 | Wan | C22B 11/04 75/744 |
| 6,270,555 B1 | 8/2001 | Wood | |
| 6,346,223 B2 | 2/2002 | De Matos | |
| 6,569,391 B1 | 5/2003 | Arias | |
| 6,696,283 B1 * | 2/2004 | Brierley | C22B 3/18 435/252.1 |
| 7,455,715 B2 * | 11/2008 | Harlamovs | C22B 19/26 75/743 |
| 7,488,370 B2 | 2/2009 | Hourn | |
| 7,691,346 B2 | 4/2010 | Curtis | |
| 7,964,016 B2 * | 6/2011 | Pereira | C22B 23/0407 75/743 |
| 8,623,115 B2 | 1/2014 | Langhans | |
| 9,238,850 B2 | 1/2016 | Korzenski | |
| 9,534,273 B2 | 1/2017 | Langhan | |
| 10,480,046 B2 * | 11/2019 | Eksteen | C22B 15/008 |
| 2010/0226837 A1 | 9/2010 | Carlton | |
| 2016/0258038 A1 | 9/2016 | Hourn | |

OTHER PUBLICATIONS

Oct. 10, 2019, WIPO, PCT/US19/32310 Opinion.
Feb. 21, 2014, Pennstrom, Hycropt Oxidation Pilot Overview.
Nov. 3, 2014, Roth, Hycroft Project NI 43-101 Technical Report.
Jan. 1, 2011, Calderia, The Role of Carbonate Ions in Pyrite Oxidation in Aqueous Systems.
Dec. 24, 2009, Caldeira, The Role of Carbonate Ions in Pyrite Oxidation in Aqueous Systems, Geochimica et Cosmochimica Acta 74 (2010), p. 1777-1789.
1992, Marsden, The Chemistry of Gold Extraction, pp. 161-163.
2005, Solvay Chemicals, Trona-Sodium Sesquicarbonate, Technical Publication.
Apr. 27, 2017, Corvus Gold Inc., NR-17-5, Cornus Gold Recieves Sulfide Gold Recovery of +90% Using AAO Process at the North Bullfrog Project, Nevada.

* cited by examiner

Simplified Process Flow Diagram for the Hycroft Process Facility

ALKALINE OXIDATION METHODS AND SYSTEMS FOR RECOVERY OF METALS FROM ORES

This application: (i) claims under 35 U.S.C. § 119(e)(1) the benefit of the filing date of U.S. provisional application Ser. No. 62/671,995 filed May 15, 2018; and, (ii) claims under 35 U.S.C. § 119(e)(1) the benefit of the filing date of U.S. provisional application Ser. No. 62/747,120 filed Oct. 17, 2018, the entire disclosures of each of which are incorporated herein by reference.

BACKGROUND OF THE INVENTION

Field of the Invention

The present inventions relate to mining and ore recovery methods and systems, including leach pad methods and systems for recovery of metals from ores containing sulfur.

Leaching of sulfide and transition ores has many challenges and prior to the present inventions was not economically possible or feasible for low-grade ore bodies. These problems include that pH must be maintained at optimal ranges. pH has a profound impact on Au—CN complex stability. The most commons pH modifiers in gold extraction are calcium hydroxide (lime) or sodium hydroxide (caustic soda) and testing has shown that with most gold ore the best gold liberation is at pH 9.9-10.4. If lime is used and the pH is too high Ca-precipitates, Fe—OH is formed and gold cyanide formation is disrupted due to decreased free cyanide concentrations. These problems result in the kinetics slowing and eventually leading to the failure of the leach heap to economically recover gold.

The inability to process sulfide ore and transition ore in leaching heaps has been a long standing problem. Sulfides, when present in a heap leach operations, will oxidize and produce acid. More lime will be required to neutralize this acid, than a traditional oxide heap. In some cases, caustic soda is added as a short term preventive method, but can form gelatinous precipitates with silica, which plug leach drip emitters and irrigation lines and flow paths in the heap. Lime is also known to passivate pyrite surfaces precluding or limiting oxidation needed to facilitate gold and silver recovery. Thus, preventing a runaway process resulting in the ultimate failure of the heap.

Predicting how much more lime is required at any one point in time in a sulfide and transition ore heap leach is almost impossible and does not provide a solution to this long standing problem. Lime requirements and needed addition, cannot be adequately predicted because obtaining a representative sample is extremely difficult due to the dynamics of the heap. If lime addition is underestimated, acid production will outrun the initial neutralizing power of the heap. The current heap leach pH monitoring and control technology is not equipped to handle such an event, and once the entire heap is net acidic gold recovery drops to zero and the opportunity to re-establish leaching it is essentially lost. This is a significant and very costly risk and problem, that prior to the present inventions the art has been unable to solve.

A further problem with sulfide and transition ore heap leaching is that increasing alkalinity to neutralize a runaway heap is limited by the irrigation rate, preferential flow paths in the heap and the solubility of lime in water. There are physical limitations with this approach that cannot be improved. Short term addition of caustic soda may spike the pH but does not provide the essential alkalinity needed for longer term acid buffering and has precipitate problems which impacts the operation.

Ultimately, prior to the present inventions all sulfide and transition ore heap leach systems using lime will fail at some level. With these failures there is lost revenue, and more significantly and detrimentally sterilization of recoverable Au, Ag.

As used herein, unless specified otherwise, "mining", "mine" and similar such terms, are used in their broadest possible sense; and would include all activities, locations and areas where materials of value, e.g., ore, precious metals, minerals, etc., are removed or obtained from the earth.

As used herein, unless specified otherwise, "leaching", "heap leaching", "heap" and similar such terms, are used in their broadest possible sense; and would include all activities, locations and systems where processes, including industrial mining processes extract precious metals, such as gold, silver, copper, aluminum, uranium and other elements and compounds from ores through a series of chemical reactions.

As used herein, unless specified otherwise these terms are used as follows. Ores having cyanide-soluble metal, e.g., gold, contents of 70% or higher are classified as "oxide ore." Those with cyanide-soluble metal, e.g., gold contents below 30% are considered "sulfide." The remainder, with cyanide-soluble metal, e.g., gold contents between 30 to 70% are considered "transition ores."

The sulfide sulfur concentration in sulfide ores can range from 0.5% to as high as 10%, be from about 0.1% to about 5%, about 0.5% to about 2%, about 1% to 10% and higher and lower concentrations. The sulfide sulfur concentration in transition ores can be from can range from about 0.5% to as high as 10%, 0.1% to about 5%, about 0.5% to about 2%, about 1% to 10% and higher and lower concentrations. Pyrite ore typically has a cyanide-soluble gold content of less than 30%, less than 20% and less than 10%; and has a sulfide sulfur concentration of 0.5% to as high as 10%, about 0.1% to about 1%, about 0.5% to about 2%, and about 1% to about 10%, and higher and lower concentrations.

As used herein, unless specified otherwise the terms %, weight % and mass % are used interchangeably and refer to the weight of a first component as a percentage of the weight of the total.

As used herein, unless specified otherwise "volume %" and "% volume" and similar such terms refer to the volume of a first component as a percentage of the volume of the total, e.g., formulation, mixture, preform, material, structure or product.

Generally, the term "about" and the symbol "~" as used herein, unless specified otherwise, is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure, this would include viscosities.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

The present inventions advance the art and solve the long standing need for efficiently removing minerals and precious metals from ores. In particular, the present inventions solve the long standing problem of recovering precious metals and minerals, e.g., gold and silver, from sulfide containing ores using heap leach operations. The present inventions, among other things, advance the art and solves these problems and needs by providing the articles of manufacture, devices and processes taught, and disclosed herein.

There is provided a system for the processing and recovery of metals from ores having high sulfide content, the system having: a crushing segment having: (i) an ore having a metal and a sulfide; and, (ii) crushing equipment; an oxidizing pH moderating material handling and distribution segment, the handling and distribution segment having an oxidizing pH moderating material and distributing equipment; wherein handling and distribution segment is configured to meter and add the oxidizing pH moderating material to the ore having a metal and a sulfide; the crushing segment, the handling and distribution segment, or both, configured to mix and conduct an oxidation reaction; and, whereby the sulfide is oxidized and thereby creating a pre-oxidized ore; a heap leach segment, having the pre-oxidized ore and a reagent for extracting the metal from the pre-oxidized ore, thereby forming a solution having the metal; a metal recovery segment, whereby the metal is recovered from the solution.

Still further, there is provided these systems and methods having one or more of the following features: wherein the system is a surface mine in the earth; wherein the ore includes a sulfide ore; wherein the ore includes a transition ore; wherein the ore includes a sulfide ore and a transition ore; wherein the ore includes a sulfide ore, a transition ore and an oxide ore; wherein the ore includes a sulfide ore and an oxide ore; wherein the ore includes a transition or and an oxide ore; having a holding pile of pre-oxidize ore, wherein the oxidation reaction continues in the holding pile; wherein the ore has a moisture content of from about 2% to about 10%; wherein the ore has a moisture content of from about 2% to about 5%; wherein the pre-oxidized ore in holding pile has a moisture content of from about 2% to about 10%; wherein the pre-oxidized ore holding pile has a moisture content of from about 2% to about 5%; wherein the ore has a density is about 40%; wherein the ore has a density of about 20% to about 60%, and all values within this range; wherein the pre-oxidized ore in holding pile has a density of about 30% to about 50%; wherein the metal recovery segment is a Merrill-Crowe plant; wherein the metal recovery segment includes a zinc cementation system; wherein the oxidizing pH moderating material includes trona; wherein the oxidizing pH moderating material includes soda ash; wherein the pre-oxidized ore has a P80 particle size of from about 0.25 inches to about 1 inch; and wherein the pre-oxidized ore has a P80 particle size of from about 0.5 inches to about 0.75 inches.

Additionally, there is provided a system for the processing and recovery of metals from ores having high sulfide content, the system having: a crushing segment having; an oxidizing pH moderating material handling and distribution segment, the handling and distribution segment having an oxidizing pH moderating material and distributing equipment; wherein handling and distribution segment is configured to meter and add the oxidizing pH moderating material to an ore having a metal and a sulfide; the oxidizing pH moderating material selected from the group consisting of trona, soda ash, and a mixture of soda ash and trona; the crushing segment, the handling and distribution segment, or both, configured to mix and conduct an oxidation reaction; a heap leach segment, having a pre-oxidized ore having a particle size of from about 0.5 inches to about 0.75 inches, and a reagent having cyanide, for extracting the metal from the pre-oxidized ore; and, a metal recovery segment.

Furthermore, there is provided these systems and methods having one or more of the following features: having a sulfide ore, the sulfide ore having a metal enrichment and wherein the metal recovery segment includes at least about 60% of the metal from the metal complex in the ore; having a sulfide ore, the sulfide ore having a metal enrichment, and wherein the metal recovery segment includes at least about 70% of the metal from the metal complex in the ore; having a sulfide ore, the sulfide ore having a metal enrichment, and wherein the metal recovery segment includes at least about 80% of the metal from the metal complex in the ore; and wherein the metal is selected from the group consisting of gold, silver and cooper.

In addition there is provided a system for the processing and recovery of metals from ores having high sulfide content, the system having: a crushing segment having: (i) an ore having a metal and a sulfide; and, (ii) crushing equipment; an oxidizing pH moderating material handling and distribution segment, the handling and distribution segment having an oxidizing pH moderating material and distributing equipment; wherein handling and distribution segment is configured to meter and add the oxidizing pH moderating material to the ore having a metal and a sulfide; the crushing segment, the handling and distribution segment, or both, configured to mix and conduct an oxidation reaction; whereby the sulfide is oxidized and thereby creating a buffered pre-oxidized ore; a heap leach segment, having the pre-oxidized ore and a reagent for extracting the metal from the pre-oxidized ore, thereby forming a solution having the metal; and, a metal recovery segment, whereby the metal is recovered from the solution.

Yet further, there is provided these systems and methods having one or more of the following features: having a holding pile of pre-oxidize ore, wherein the oxidation reaction continues in the holding pile; wherein the buffered pre-oxidized ore has a pH of about 8 to about 10; wherein the buffered pre-oxidized ore is buffered to a pH of 10.3; wherein the buffered pre-oxidized ore is buffered to a pH of about 10.3; wherein the pre-oxidized ore has a total alkalinity of about 15,000 ppm to about 60,000 ppm; wherein the pre-oxidized ore has a total alkalinity of 15,000 ppm to 60,000 ppm; wherein the pre-oxidized ore has total alkalinity of about 20,0000 ppm; and wherein the pre-oxidized ore has total alkalinity of 20,0000 ppm.

In addition there is provide a system for the processing and recovery of metals from sulfide ores, the system having: a means for crushing, the means having: (i) an ore having a metal and a sulfide; and, (ii) a primary and secondary crusher; a means for delivering an oxidizing pH moderating material to the ore, the means having an oxidizing pH moderating material selected from the group consisting of trona, soda ash, and sodium nitrate; a means for mixing the oxidizing pH moderating material and ore; and, a means for conducting an oxidation reaction; whereby the sulfide is oxidized and thereby creating a pre-oxidized ore; and a means for separating and recovering the metal from the pre-oxidized ore; whereby at 70% of the metal is recovered from the ore.

A method for the processing and recovery of metals from ores having high sulfide content, the method having: a means for crushing, an ore having a water content and a metal and a sulfide; mixing the ore with an oxidizing pH moderating material, and thereby forming a mixture of the ore and the oxidizing pH moderating material; the oxidizing pH moderating material: oxidizing the sulfide for a first time period; buffering the mixture; whereby the mixture has a pH of about 7 to about 10 during the first time period; whereby a pre-oxidation ore is formed during the first period of time, the pre-oxidized ore having a percentage of the sulfide oxidized; during a second time period leaching the pre-oxidized ore with a reagent to form a pregnant solution having the metal; recovering the metal from the pregnant solution, whereby 60% to 95% of the metal is recovered from the ore.

Moreover, there is provided these systems and methods having one or more of the following features: having rinsing the pre-oxidized ore after the first period of time; having rinsing the per-oxidized ore before the second period of time; having second time period and the first time period do not overlap; wherein the first time period is from about 30 days to about 150 days; wherein the second time period is from about 10 days to about 50 days; wherein the first time period is less than 120 days; wherein the second time period is less than 40 days; wherein the first time period is less than 120 days, and wherein the percentage of sulfide oxidized is greater than 20%; wherein the first time period is less than 120 days, and wherein the percentage of sulfide oxidized is greater than 20%; wherein the first time period is less than 120 days, and wherein the percentage of sulfide oxidized is at least 20%; wherein the second time period is less than 40 days, and wherein the percentage of sulfide oxidized is at least 20%; and wherein the second time period is less than 40 days, and wherein the percentage of sulfide oxidized is greater than 20%; wherein the second time period is less than 40 days, and wherein the percentage of sulfide oxidized is at least 20%.

Still further, there is provided these systems and methods having one or more of the following features: wherein the metal is selected from the group consisting of gold, silver and cooper; and wherein an oxidizing pH moderating material is selected from the group consisting of trona, soda ash, and sodium nitrate.

In addition, there is provided a method of recovering a precious metal from an ore having: forming an aqueous layer on the surface of a particle of the ore; the aqueous layer having an oxidizing pH moderating material, wherein the oxidizing pH moderating material buffers the aqueous layer; the aqueous layer defining a surface expose to air; wherein an oxidation reaction is carried out in the aqueous layer; there after the ore particle is subjected to heap leaching for extraction of the precious metal from the ore.

DESCRIPTION OF THE PREFERRED EMBODIMENTS

Figure 1:
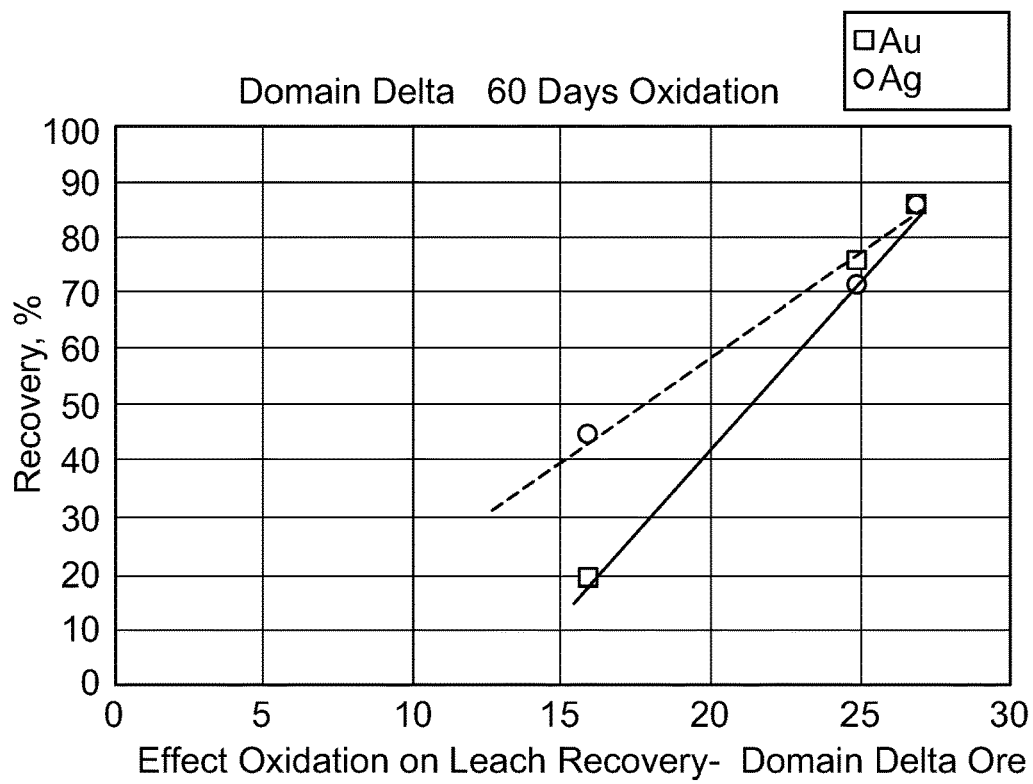
FIG. 1 is a chart illustrating the effect of oxidation on leach recovery for ore from Domain Delta in accordance with the present inventions. The x-axis being recovery and the y-axis being % sulfide sulfur oxidation.

In general, the present inventions relate to mining and industrial separation systems and processes for recovery of minerals, including precious metals.

Generally, embodiments of the present inventions relate to systems and methods for oxidizing and leaching transitional and sulfidic material in a heap leach application.

In an embodiment of the present processes, an ore containing a mineral is mined from the ground, if needed the ore can be crushed to a predetermine particle size and distribution. The ore is then subjected to a first chemical treatment, in which the ore is contacted a first moiety and a second moiety. The first moiety reacts with the mineral forming a mineral-first moiety reaction complex. This mineral-first moiety reaction complex is carried by a fluid, typically water, away from the ore.

The second moiety performs one or more functions, including for example, a buffer, pH control, a pH buffer, a competing reactant and one or more or all of these. Thus, in one aspect, whether because of concentration, reaction kinetics or other reasons, the second moiety is more likely to react with one or more undesirable materials in the ore, than is the first moiety. In this manner the second moiety minimizes, mitigates, or prevents the undesirable materials in the ore from reacting with the first moiety, or otherwise being used up by or rendered in effective (chemically, economically or both) by the undesirable materials.

The addition of the first moiety and the second moiety can be at the same time, or same stage, in the process or they can be at different times or stages in the process. Thus, the second moiety can be added as a dry component with the ore, can be added to the ore as part of liquid solution, e.g., aqueous solution, or both. The second moiety can be rinsed away, or otherwise removed from the ore (after its intended reaction has taken place), before the addition of the first moiety. The use of the term "first" and "second" does not require a particular timing for the use of these moieties in the process. Thus, the first can be used later in the process than the second, they can be used at the same time or stage, the second can be used later in the process than the first, and combinations and variations of these.

The mineral-first moiety complex in the fluid is then subjected to further treatment (chemical, thermal, or both) where mineral is removed (e.g., separated, removed, extracted, etc.) from the first moiety. Typically, this removal, or second step, is conducted after the fluid with the mineral-first moiety complex is carried away from the ore, e.g., flowed into a separate holding basin, pond, structure, tank, or location in the system or plant. Typically, after removal the mineral can then be washed, concentrated, collected and one or more of these and other processing steps.

The embodiments of the present pre-oxidation then CN-leach processes (e.g., "oxidation-leach" technologies) can use soda ash as the second moiety. Soda ash (sodium carbonate) is an acid neutralizer that has a much higher solubility than lime. Its natural precursor is trona, which is a 1:1 mixture of soda ash and sodium bicarbonate. Its solubility is about 12% at room temperature. In contrast, lime has a solubility of 0.08%. Trona, because of its higher solubility, can deliver five times or more neutralizing power compared to lime alone and due to the sodium ion in Trona, instead of the calcium ion in lime, it does not form calcium carbonate and is less likely to precipitate. For a sulfide leach pad, trona is therefore five times more effective than lime in de-risking the heap leach operations from pH loss. A sodium rich system also offers the benefit of not armoring or passivating the pyrite surfaces addressing a long-standing problem which occurs in a lime system. Sodium carbonate works to keep the pyrite surfaces clean, due to the "carbonate effect". Carbonate in solution keeps the sulfide surfaces clean during oxidation, improving the oxidation rate compared to other neutralizing agents.

The embodiments of the present oxidation-leach technologies can use trona-lime combinations as the second moiety. In a trona-lime neutralizing system, the barren cyanide solution sent to the heap will contain cyanide species and essentially a carbonate-bicarbonate solution where the carbonate to bicarbonate ratio is 1. This ratio will ensure a pH of 10.3 due to the bicarbonate-carbonate buffer formed naturally by $Na_2CO_3$—$NaHCO_3$. As the trona in solution neutralizes acid in the heap, a portion of the carbonate ($CO_3^{2-}$) will be converted to bicarbonate ($HCO_3^-$), which changes the ratio. The pH change in the pregnant cyanide solutions will be controlled by the carbonate-bicarbonate buffer, typically as long as an excess of trona is present. In addition, prior to return of the barren solution to the heap, the ratio of carbonate to bicarbonate can be restored to 1 by adding hydrated lime (regeneration). Hydroxide reacts with bicarbonate to convert it to carbonate, and calcium reacts with sulfate and carbonate to precipitate gypsum and calcite.

Embodiments of the oxidation-leach technologies of the present inventions include Atmospheric Alkaline Oxidation ("AAO") to pre-oxidize pyrite in sulfide and transition ore flotation concentrates and achieve commercial CN leach recoveries in a standard flotation and conventional cyanidation of the oxidized concentrate. Thus, embodiments utilize a carbonate assisted (Trona) pyrite oxidation technology to allow commercial cyanide leach recovery of gold and silver in a sulfide heap leach (SHL) application. It is theorized that it is the ferrous/ferric couple chemistry that drives the oxidation in this embodiment and it is made possible in alkaline environments by the use of Trona based solutions.

In an embodiment of an oxidation-leach methodology, unstable pyrite mineralogy that oxidizes rapidly, namely pyrite/marcasite is used. A rate affecting and potentially limiting category in SHL pyrite oxidation is the ability to produce physical exposure of the pyrite in commercial heap leach crush sizes and achieve economic gold and silver recoveries from the extent of oxidation possible. Pyritic ores provide opportunity for this as the mineralogy controls are favorable to a coarse crushed exposure of the targeted enriched pyrite. Thus, in this embodiment, unlike low-grade sulfide resources in epithermal deposits, it is preferred to have ores that demonstrate predominantly fracture-controlled sulfide mineralization. As such, the ore consistently breaks as shearing along these fracture planes that host the pyrite mineralization at the coarse crush sizes commercially practical for heap leach models. Liberation of the more friable fine-grained marcasites occurs on these fracture shears during coarse crushing and the larger pyrite crystals in the fracture shears, not fully liberated, present faces available for attack with oxidizing solution.

In embodiment of an oxidation-leach methodology, the gold enrichment pyrites exists predominantly in the form of rimming on the pyrite, rather than as inclusions or in solid solution through the core of the pyrite. It is theorized that because of this, commercially viable cyanide extraction from the gold enriched rims with just partial oxidation of the pyrite content is obtained. Thus, oxidation of the barren core of the mineral to gain cyanide leachability of the gold deposited along grain boundaries is not required. A partial oxidation of the pyrite at the surfaces returns gold recoveries that are disproportionately higher than the pyrite oxidation required to achieve them.

Embodiments of these processes can be performed in systems or plants that provide the capability for conducting the treatments, reactions and removal activities of the processes. Thus, for example, these processes can be conducted in heap leaching systems, in situ mining systems, flotations systems, vat leaching systems, lagoon systems, tank systems, and other batch and continuous systems. Embodiments of the present systems and methods can be performed on many types of ores and mineral deposits, including: epithermal deposits, low sulfidation deposits, hot springs deposits, disseminated deposits, vein-controlled deposits, oxide ores, transitional ores, sulfide ores, and combinations and variations of these and other types of ores and depositions.

Depending upon the reactions taking place, the density of the ore, the volume of ore, the concentration of the mineral, and other factors, the ore can be in particle or piece sizes of from about 1 µm to about 1,000 mm, from about 50 µm to about 300 µm, from about 0.1 mm to about 0.5 mm, from 0.25 mm to about 2 mm, from about 2 mm to about 64 mm, from about 4 mm to about 32 mm, from about 8 mm to about 16 mm, from about 16 mm to about 50 mm, from about 60 mm to about 260 mm, as well as all sizes within these ranges, and larger and smaller sizes. These sizes can be for the individual particles or pieces of ore used in the process, they can be the largest particle size where all others are smaller (sieve distribution), they can be an average particle size, they can be a $D_{50}$ particle distribution (the size of the particles making up 50% of the total particle size population), or they can be a distribution where 80% of particle sizes are smaller than these sizes.

In embodiments, the ability of oxygen, for example from air, to contact the ore during the process, can be important and depending upon the reaction needed. Oxygen can be a react in the one or more of the steps of the present processes. While oxygen can be dissolved in the fluid used to carry the moieties, the amount of oxygen that can be carried is limited, e.g., water can carry about 9 mg/L at 20° C. Thus, the amount of fluid, e.g., aqueous solution of water and first and second moiety, on the ore should be less than the amount that completely saturates the ore. In this manner the ore that is being treated in the present process can be at about 80% to 99% saturation, (i.e., saturated with the fluid); about 85% to about 95% saturation, and preferably 95%, 96%, and from 97% to 98% saturation, as well as all percentages within these ranges and higher and lower percentages. As used herein "saturated" and "saturation" are given their common meaning, and thus include the maximum amount of water that the ore can absorb or hold. It being understood that the fluid can be also be oxygenated (e.g., oxygen is added to the fluid), that the ore can be mechanically configured (e.g., beds in a reactor), other sources of oxygen can be provided in the fluid, or may be added to, or present in, the ore itself, and combinations and variations of these.

The recovery of metal, e.g., gold or silver, to oxidation ratio (% recovery/% oxidation), in embodiments, can be affect by, and preferably increased by, the particle sizes used in the process. Grinding ore particles into smaller fractions serves to increase the exposed surface area of sulfide that can be oxidized, but also creates oxidation sites that do not serve to liberate gold once oxidized. Thus, for smaller grind sizes, e.g., less than 0.5 inches, and less about 0.25 inches, a greater degree of oxidation must be achieved in order to achieve recoveries that are similar to recoveries achieved in larger grind sizes, e.g., 0.5 inches to about ¾ inches, under otherwise similar conditions.

A factor in obtaining good oxidation % and good recover % is the degree of permeability in the ore bed, and maintaining that permeability during processing. Preferably in embodiments good permeability is maintained in the ore bed during oxidation and leaching. Bed permeability maximizes the exposure of sulfides to oxygen during oxidation, and to the leach solution during the leach stage. This suggests that, during operations, close attention to the crush size of the ore would be beneficial, as well as controlling the proportion of coarse to fine materials. For the two-step process, e.g., peroxidation and leach, maintaining permeability is beneficial for, at least, the following reasons:

First, the short leach cycle can better be achieved if the ore is sufficiently oxidized. The process is premised upon a long oxidation period that is "rewarded" with fast leach kinetics. If the required oxidation is not achieved, the sulfide and transition ore leach kinetics will become slow, hurting the economics of the process.

Second, oxidation should occur during the pre-oxidation stage where there will be sufficient neutralizer present. One goal is to oxidize the bulk of the sulfide sulfur such that the remaining sulfide sulfur is low enough in concentration and slower oxidizing. The rate of acid production during the leach cycle would then be too slow to overwhelm the protective alkalinity in the cyanide leach solution.

Third, permeability permits more efficient wash down of the residual carbonates in the heap and maximize contact between the oxidized ore and the leaching solution.

Embodiments of the process and system can be used to process large amounts of ore, in a semi-continuous, continuous or batch process. Thus, the process can process about 50 to about 10,000,000 tons, about 50 tons and more, about 100 tons and more, about 1,000 tons and more, about 10,000 tons and more, about 100,000 tons and more, about 1,000,000 tons and more, about 10,000,000 tons or more, as well as all amounts within these ranges, and greater and smaller amounts.

The amounts of ore can form heaps that are built in, or have several layers of material, with each layer having a height of about 1 m to about 20 m, about 5 m to about 10 m, about 6 m, as well as all heights within these ranges, and greater and smaller amounts. Thus, the total height of a heap, can be from about 4 m to about 40 m, about 5 m to about 20 m, about 6 m to 30 m, about 10 m to about 25 m, as well as all heights within these values and larger and smaller amounts.

In embodiments, the fluid carrying the moieties may be applied to the ore, in such a heap, through a number of cycles, e.g., leach cycles. Each leach cycle can last from about 30 days to about 500 days, about 50 days to about 300 days, about 100 days to about 200 days, about 50 days to about 150 days, about 75 days, about 90 days, about 120 days, as well as all values within these ranges and greater and smaller times. In embodiments, the fluid can be to the ore at rates of from about 1 L/hr/m² to about 50 L/hr/m², about 5 L/hr/m² to about 25 L/hr/m², about 8 L/hr/m² to about 20 L/hr/m², about 9 L/hr/m² to about 12 L/hr/m², as well as all rates within these ranges, and larger and smaller rates. One, two, three, or more leach cycles can be applied to a particular heap of ore. Additional ore can also be added to the heap between leach cycles.

Leach pads are under these heaps (e.g., the ore is placed on top of the pad as the head is built), and collection systems, e.g., pipes, channels, conduits, to collect the fluid after it percolates through the ore and contains the mineral-first moiety complex.

In embodiments, the sulfide minerals can contain gold, silver, copper, or uranium.

In an embodiment, the processing of the run-of-mine oxide and transition ores is conducted. Oxide and transition ores that will be crushed before stacking on the heap leach pad. All sulfide ore in the mine will be crushed, oxidized and leached. Some transition ores may use the sulfide protocol. Oxidation of sulfide ores is accelerated in the presence of carbonate, which may be supplied by trona or soda ash. Resulting cyanide leach recovery of these oxidized sulfide ores yields about 70% to 85% recovery. In essence, the oxidation of sulfide and transition ores converts them into oxide ores.

In an embodiment control parameters in the oxidation process, among others, are pH and oxygen availability. The oxidation is conducted in the presence of sufficient trona or soda ash to keep the pH near the buffer region between carbonate and bicarbonate (pH 10.3). At this pH regime, ferrous and ferric carbonate complexes become stable and provides a carbonate complex version of the Fe(II)/Fe(III) couple. During operations, iron ions will already be present in the recycled carbonate solutions which should initiate the reaction. Oxygen is the ultimate oxidizer in the process. Natural air pockets are formed during stacking of the ore and maintained during the oxidation phase and the leach phase. The ore is just wet enough to promote the reactions that occur in aqueous phase while keeping the interstices in the stack open for air to occupy. 60, 90 and 120 day oxidation times are used. These time times may be shorter if the presence of iron in recycled carbonate solutions is exploited, provided permeability of the ore stack is maintained.

In embodiments, in particular for the recovery of gold or silver from ore, the first moiety can be a CN (Cyanide) solution, which preferably has lime, and the second moiety can be a mixture of soda ash ($Na_2CO_3$) and sodium bicarbonate ($NaHCO_3$), the mixture can be from about 20% soda ash to about 80% bicarbonate, from about 80% soda ash to about 20% bicarbonate, from about 40% soda ash to about 60% bicarbonate, from about 60% soda ash to about 50% bicarbonate, and about 50% soda ash and 50% bicarbonate, about 60% carbonate and 40% bicarbonate, as well as, all ratios within these ranges, and larger and smaller percentages. Trona (trisodium hydrogendicarbonate dihydrate) ($Na_2CO_3 \cdot NaHCO_3 \cdot 2H_2O$) is a preferred second moiety for use in processing gold containing ores. Other oxidizers may also be used as the second moiety, or in conjunction with, soda ash, bicarbonate, mixtures of soda ash and bicarbonate, and trona. For example, the second moiety can be Sodium Nitrate.

Trona is a naturally occurring evaporate mineral with the chemical formula $Na_2CO_3NaHCO_3 \cdot 2H_2O$. The largest known deposit of trona in the world is found in the Green River formation of Wyoming and Utah. During the atmospheric oxidation, trona provides neutralizing capacity for the acid produced when sulfides are oxidized in a slurry. Both the carbonate and bicarbonate species can react with acid, depending on availability and pH. The oxidation and acid neutralization can be represented by the following reactions:

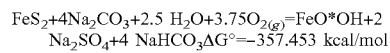
$FeS_2+4Na_2CO_3+2.5\ H_2O+3.75O_{2(g)}=FeO*OH+2\ Na_2SO_4+4\ NaHCO_3 \Delta G°=-357.453\ kcal/mol$

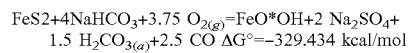
$FeS2+4NaHCO_3+3.75\ O_{2(g)}=FeO*OH+2\ Na_2SO_4+ 1.5\ H_2CO_{3(a)}+2.5\ CO\ \Delta G°=-329.434\ kcal/mol$ The oxidation process for sulfide concentrates is preferably conducted at elevated temperatures, but below boiling, to maximize the reaction rate. The reaction may be carried out to neutral pH to minimize lime neutralization requirement prior to cyanidation, or to the extinction of carbonate and bicarbonate in solution to optimize trona consumption. It is possible to carry out the reaction to very acidic pH but this may lead to the formation of jarosites.

It is theorized that the Fe3+/Fe2+ couple may play a role in the oxidation process. Initially, it was thought that trona played purely a neutralizing duty. However, preliminary results of exploratory experiments suggested that trona may be speeding up the oxidation reaction. This finds support in testing results. Oxidation tests conducted in columns of crushed ore show that the presence of trona accelerated the oxidation process at ambient temperatures. The mechanism proposed for this process involves the catalytic effect of the ferric and ferrous redox couple, where ferric and ferrous ions are stabilized in solution by carbonate or bicarbonate. Table 1 below is a list of carbonyl or bicarbonyl complexes that have been identified as stable in non-acidic solutions in the presences of high concentrations of carbonate or bicarbonate.

TABLE 1

| Ferrous Complexes | Ferric Complexes |
| --- | --- |
| $FeHCO_3^+$ | $Fe(CO_3)_2^-$ |
| $FeCO_{3(aq)}$ | $FeCO_3^+$ |
| $Fe(CO_3)_2^{2-}$ | |
| $Fe(OH)CO_3^-$ | |

Figure 7:
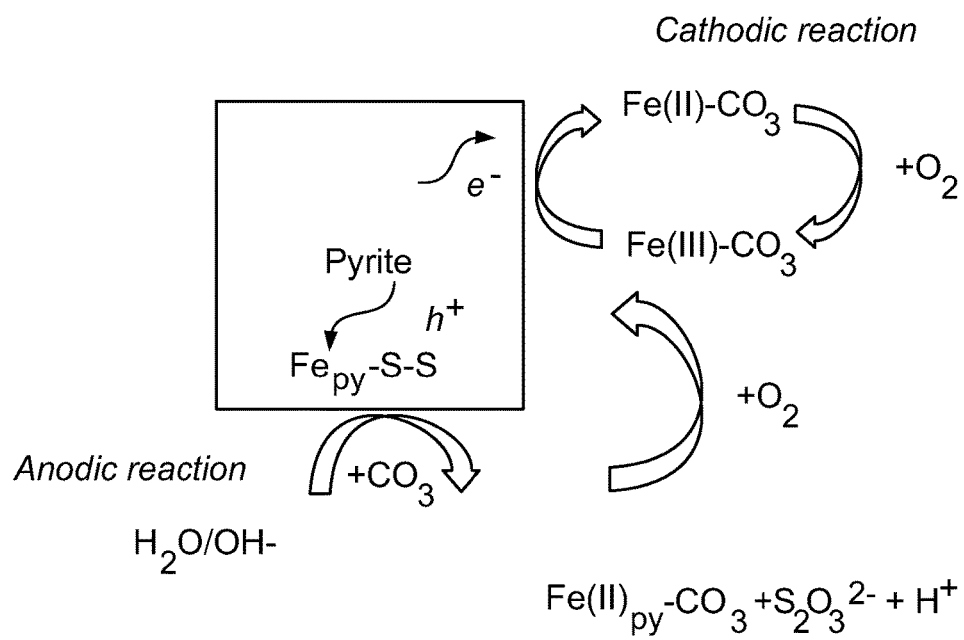
FIG. 7 is an illustration of embodiments of reactions used in oxidation-leach recovery methods and systems, in accordance with the present inventions.

It is theorized that the basic model for an embodiment of the present carbonate assisted pyrite oxidation solution involves a redox system driven at the pyrite face by the ferric/ferrous couple system. Further, the reaction rate may be limited by one of three factors: 1) ferrous iron solubility in alkaline solution; 2) the carbonate concentration; and 3) the available dissolved oxygen to regenerate ferrous to ferric. This mechanism is illustrated in FIG. 7

Thus, it theorized that, in embodiments, the ferrous/ferric couple is the driving force of pyrite oxidation at the surface of the crystal. This couple serves to bridge the solid state pyrite face to the oxidation solution and carry electrons from the pyrite face into solution where the dissolved oxygen is much more efficient to take over as the electron sink to the solution redox system. Dissolved oxygen is not an efficient oxidizer of solid state materials like pyrite. Electrostatic and gas/solid phase boundaries do not lend to efficient electron transfer (oxidation) from the pyrite solid face to iron cation release to solution. Ferric iron has long been recognized as a superior oxidizer of pyrite (and all other metal sulfides). This is owed to its ability to participate in surface bonds with the iron disulfide and create an intimate bridge interface from solid surface to solution for electrons to be transported into solution redox systems. It should be noted that no iron is oxidized by the ferric/ferrous couple into solution. The ferric ion oxidation of pyrite is centered on the attack of the sulfur leg, releasing the pyrite ferrous ions into solution as the pyrite degrades. Once deported to solution as a mobile iron cation, dissolved oxygen is then able to oxidize the ferrous ions to ferric ions (iron pump) and, thus, replenish the ferric available to pull electrons (oxidize) from the pyrite surface to solution and complete the cycle. This oxidation system, is made possible in the sulfide heap leach by the ability of trona to allow this redox cycle in an alkaline environment.

In embodiments, and given the iron pump reaction pathway, trona is used as a carbonate based sulfide oxidizing solution. Because the oxidation of ferrous ions in solution by dissolved oxygen completes the ferric/ferrous couple cycle, the first rate limiting factor is the solubility of ferrous ions in the solids wetting solution. In a standard hydroxide (lime) commercial alkaline system, ferrous iron solubility between the pH ranges of 7 and 11 is very near zero due to the insolubility in a lime-based solution of ferric hydroxide. In a lime based alkaline system, no ferric/ferrous couple cycling can occur as no ferrous/ferric ions can escape the insolubility of the ferric hydroxide solid, effectively killing the redox potential of this efficient pyrite solvent. However, in a carbonate based alkaline solution, ferrous/ferric solubility is restored to the solution with iron carbonate complexes. These ferrous and ferric carbonate complexes maintain solubility in the pH ranges required for the CN leaching of the oxidized pyrites. However, the solubility of these iron carbonate complexes in commercial CN pH ranges requires alkalinity levels (dissolved carbonate concentrations) of 15,000-25,000 ppm in the solvent solution. Trona ($Na_2CO_3$) is a preferred carbonate as it is soluble to 10%+ on leach solutions at our ambient temperatures, providing not only the alkalinity buffer to de-risk acid generation issues in Sulfide Heap Leach (SHL) commercial pH ranges, but provides the carbonate assisted solubility of the ferrous/ferric couple pyrite oxidation system in this same pH range. Trona provides a low cost, risk averse alkalinity source option for SHL. It can be solution delivered throughout the heap and allows sufficient ferrous/ferric carbonate solubility at commercial CN pH ranges to utilize the pyrite oxidation enhancement of the ferrous/ferric couple system at the pyrite faces. In embodiments, ferrous solubility is optimum at 15,000-20,000 ppm carbonate alkalinity (approx. 1.5% trona solution), and that pyrite reactivity to oxidation is also optimum at the pH range this level of trona concentration delivers.

In embodiments, and given the iron pump reaction pathway, another factor to complete the ferrous/ferric couple oxidation of pyrite is dissolved oxygen. To complete the ferrous/ferric couple redox cycle, there is a stoichiometric balance of dissolved oxygen to convert dissolved ferrous ion to ferric state. Sparging of $O_2$ gas in an application of AAO is a factor in the high oxidation rates, which translate to high recovery rates. However, in SHL applications where the ability to replenish dissolved oxygen levels through surface diffusion to replace $O_2$ consumed in the ferrous/ferric redox cycle with pyrite is limited, other ways to obtain the required dissolved oxygen levels can be used. Thus, for example, holding a wetting level of solution between 8-10 percent to maintain highly alkaline pore carbonate solution holds, while allowing maximum air to solution surface contact such that maximum availability of oxidation system dissolved oxygen is maintained can be used. This can be viewed as allowing the heap to "breath."

EXAMPLES

The following examples are provided to illustrate various embodiments of systems, processes, compositions, applications and materials of the present inventions. These examples are for illustrative purposes, may be prophetic, and should not be viewed as, and do not otherwise limit the scope of the present inventions.

Example 1

Using a sulfide ore, Atmospheric Alkaline Oxidation (AAO) pre-oxidizes pyrite ore flotation concentrates and achieves 70% or greater CN leach recoveries in a standard flotation and conventional cyanidation of the oxidized concentrate mill flow system.

Using sulfide ore, a larger scale system and process utilizes carbonate assisted, in this example, Trona based pyrite oxidation methodology to achieve the cyanide leach recovery of gold in a sulfide heap leach (SHL) application for two 5,000 ton test heaps, with leach of 60 days. High levels of leach recoveries are obtained.

Thus, there are commercially viable recoveries when utilizing Trona as an oxidation enhancement agent and acid mitigating alkalinity source.

Example 2

In a trona-lime neutralizing system, for a sulfide ore, the barren cyanide solution sent to the heap contains cyanide species and essentially a carbonate-bicarbonate solution where the carbonate to bicarbonate ratio is 1. This ratio ensures a pH of 10.3 due to the bicarbonate-carbonate buffer formed naturally by $Na_2CO_3$—$NaHCO_3$. As the trona in solution neutralizes acid in the heap, a portion of the carbonate ($CO_3^{-2}$) converts to bicarbonate ($HCO_3^{-}$), which changes the ratio. An excess of trona is present, such that the pH change in the pregnant cyanide solutions is controlled by the carbonate-bicarbonate buffer. Prior to return of the barren solution to the heap, the ratio of carbonate to bicarbonate can be restored to 1 by adding hydrated lime. Hydroxide reacts with bicarbonate to convert it to carbonate, and calcium reacts with sulfate and carbonate to precipitate gypsum and calcite.

Example 3

Heap leach oxidation and cyanide leach tests are performed on traditional lab columns. Core samples for metallurgical testing were selected to represent domains within an orebody. Taking samples from four ore domains, tests were conducted in plexiglass cylindrical columns that were 1 ft diameter and 4 ft high. Ore samples were crushed to ½ inch, blended and loaded into the columns.

Oxidation was performed for 60, 90 or 120 days by adding trona to the ore column and applying just enough solution to the column to keep the ore wet. Only enough solution drains at the bottom of the column to use for conditions measurement. This status is maintained to ensure that the interstices in the ore column are filled with oxygen-supplying air and not flooded with solution. Thus, the ore in the column is kept below saturation levels. A 50-ml sample was collected each day for pH and sulfate analysis. Oxidation was tracked by the amount of sulfate produced.

At the end of the oxidation cycle, the column is rinsed to recover sulfate held in the column and to wash down as much carbonate and bicarbonate out of the column as possible. This is followed by a lime water rinse, which will ensure that any remaining carbonate is precipitated as $CaCO_3$. The column then undergoes a standard cyanide column leach.

The results of the column oxidation followed by leach tests in general show that higher oxidation levels produce better gold and silver recoveries in the subsequent cyanide leach process. This can be seen for Domain Delta and Domain Beta ores (FIG. 1 and FIG. 2, respectively).

Figure 2:
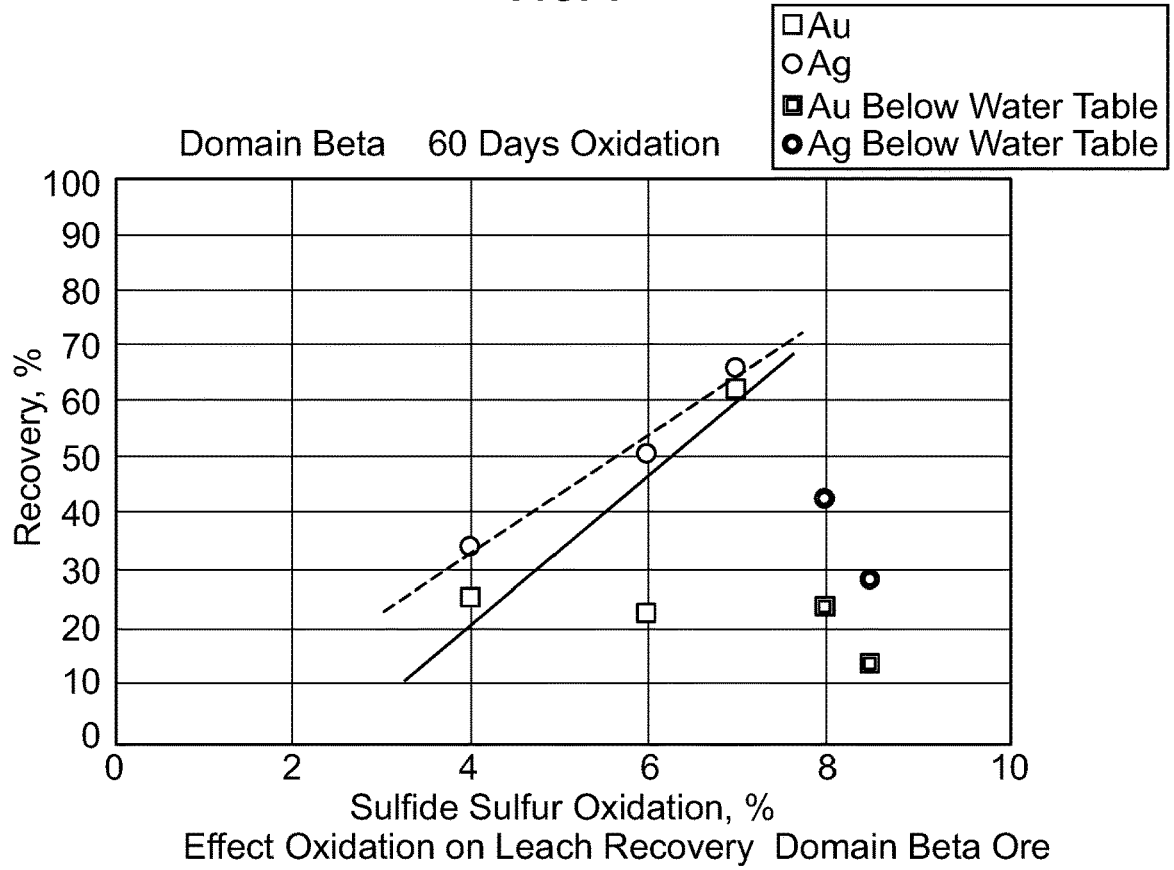
FIG. 2 is a chart illustrating the effect of oxidation on leach recovery for ore from Domain Beta in accordance with the present inventions. The x-axis being recovery and the y-axis being % sulfide sulfur oxidation.

As seen in FIG. 1, Domain Delta ores exceeded the 70% recovery target with oxidation levels of about 25% with 60 days of oxidation. Two Columns attained 85% and 75% gold recoveries, respectively. For Domain Beta, as seen in FIG. 2, leach recoveries were on target to reach 70%, despite the seemingly low oxidation levels. Also evident in the results for Domain Beta is the lower gold and silver recoveries achieved for samples taken below the water table. Generally, the recovery of precious metal can be the same for ore that is above, at and below the water table. In embodiments, the time required to oxidize the pyrite, for materials below, and at the water table can be longer than from materials above the water table. It is theorized that this is most likely due to the size of the pyrite. However, typically, oxidation rates are equal below and above the water table.

Example 4

Figure 3:
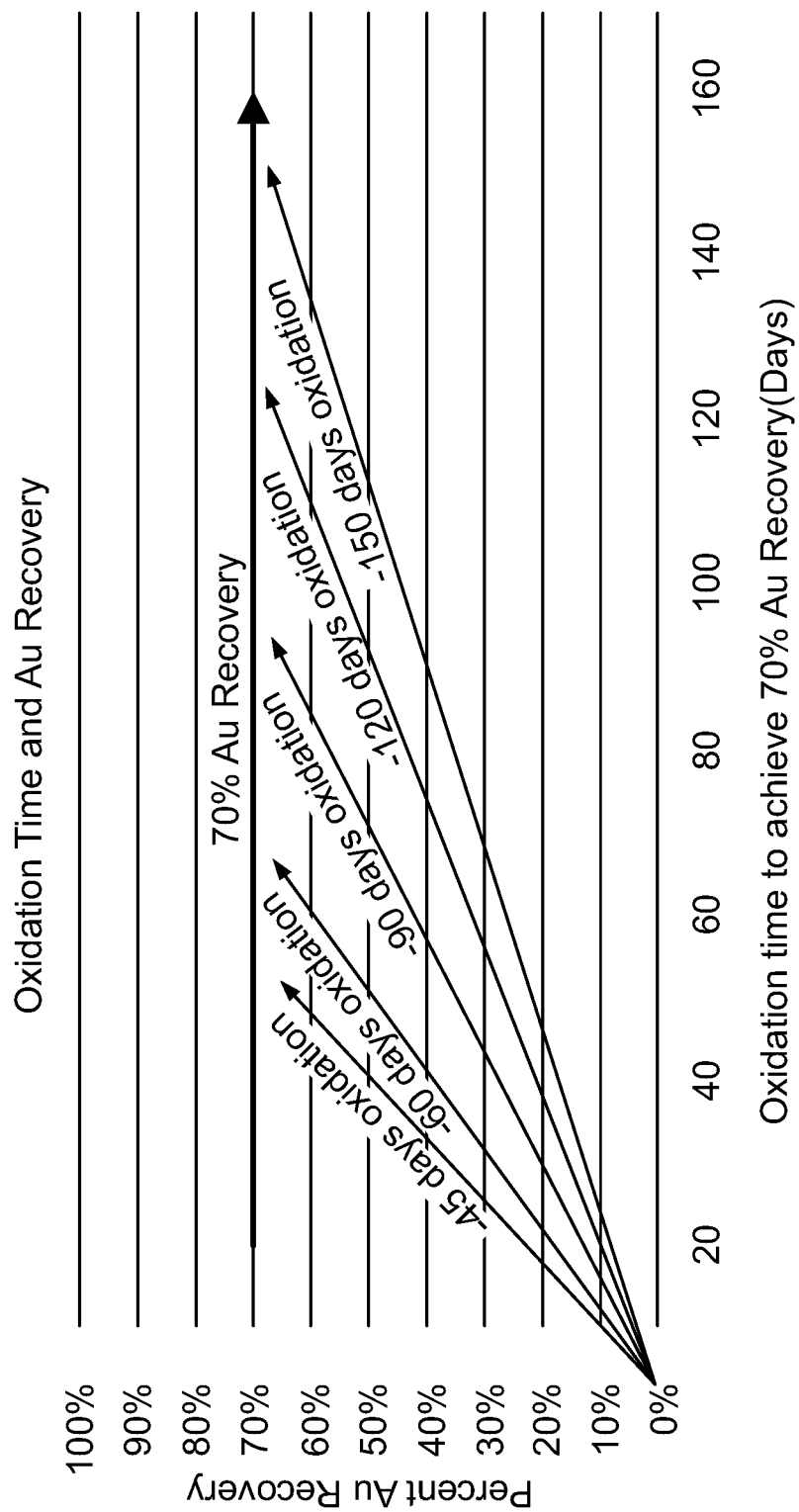
FIG. 3 is a chart illustrating the percent recovery of Gold vs oxidation time in days, for five different ore samples, to achieve 70% recovery, in accordance with the present inventions.

Turning to FIG. 3 there is shown the time in days for oxidizing five different ore samples to reach 70% Gold recovery. This Example suggests that 60%, and 70% recoveries can be achieved in most types of sulfide ores and transitions ores in 140 days of oxidation time or less, and that recoveries of 80% and greater can be obtained given sufficient oxidation times.

The oxidation times, for sulfide ores, to reach 70% recovery (or more) by standard CN leach process, can be less than about 40 days, less than about 60 days, less than about 100 days, and less than about 160 days, from about 40 days to 60 days, from about 30 days to 50 days, from about 60 days to about 120 days, and all times within these ranges, as well as shorter and longer times.

The oxidation times, for transitional ores, to reach 70% recovery (or more) by standard CN leach process, can be less than about 40 days, less than about 60 days, less than about 100 days, and less than about 160 days, from about 40 days to 60 days, from about 30 days to 50 days, from about 60 days to about 120 days, and all times within these ranges, as well as shorter and longer times.

Example 5

Silver recovery for transition and sulfide ore material is not as dependent on oxidation time as is Gold recovery. Particle size and mineralization (primarily ore below the water table) have more of an effect with respect to recovery. Silver recovery, including average recoveries, of more than 60%, more than 70%, more than 80% is expected for transition and sulfide material.

Example 6

Gold recoveries using the present oxidation process from sulfide ore materials are from 50% to 85%, from 60% to 90%, from 60% to 75%, from 65% to about 75%, from about 70% to 85%, and all recoveries within these ranges, as well as higher and lower ranges.

Example 7

Gold recoveries using the present oxidation process from transitional ore materials are from 50% to 85%, from 60% to 90%, from 60% to 75%, from 65% to about 75%, from about 70% to 85%, and all recoveries within these ranges, as well as higher and lower ranges.

Example 8

Silver recoveries using the present oxidation process from sulfide ore materials are from 50% to 85%, from 60% to 90%, from 60% to 75%, from 65% to about 75%, from about 70% to 85%, and all recoveries within these ranges, as well as higher and lower ranges.

Example 9

Silver recoveries using the present oxidation process from transitional ore materials are from 50% to 85%, from 60% to 90%, from 60% to 75%, from 65% to about 75%, from about 70% to 85%, and all recoveries within these ranges, as well as higher and lower ranges.

Example 10

Figure 4:
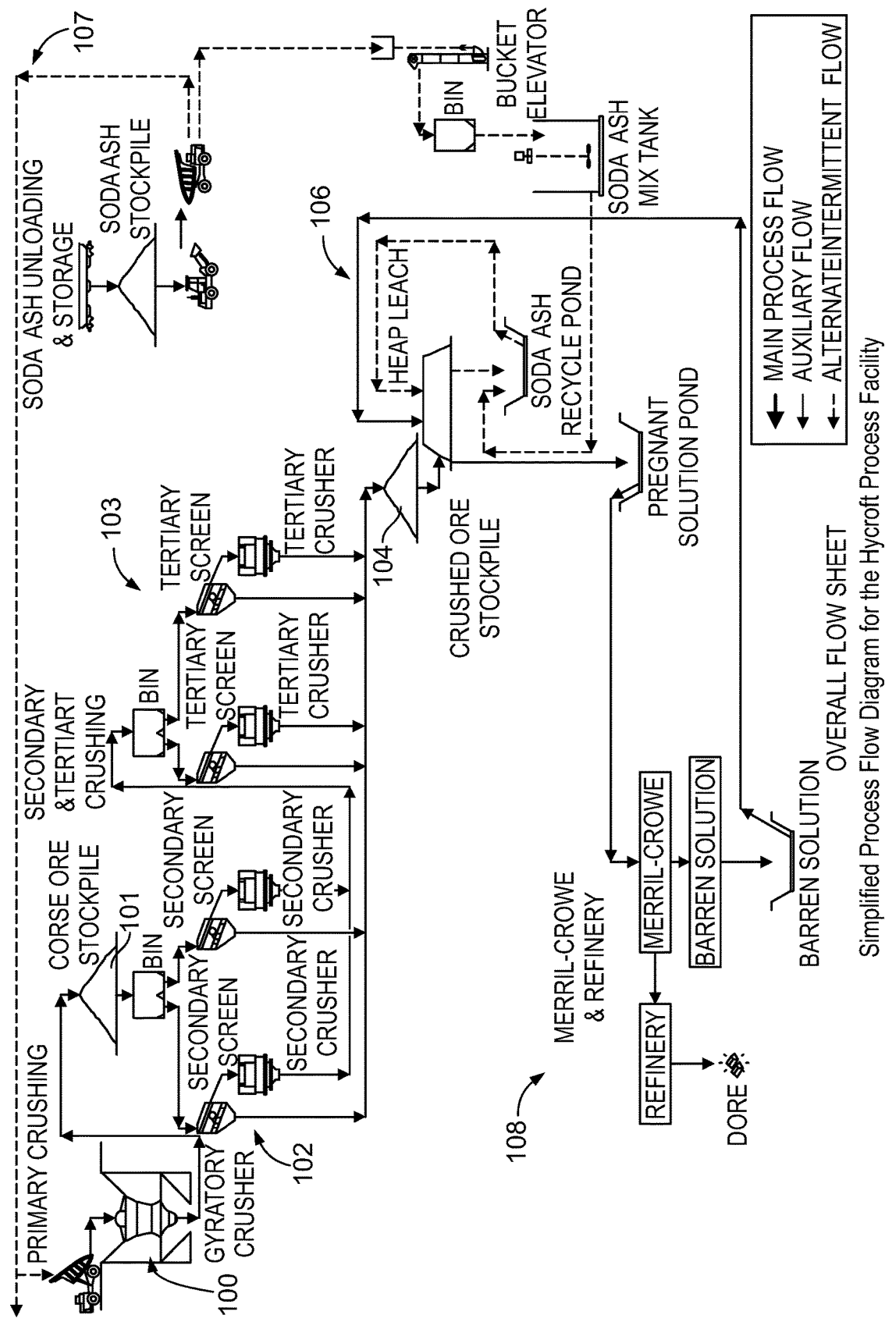
FIG. 4 is a schematic diagram showing an embodiment of a system and process flow for recovering metals from sulfide ores and transition ores in accordance with the present inventions.

Turning to FIG. 4, there is shown a layout and process flow diagram illustrating an embodiment of a system and method of the oxidation then cyanide processes to extract valuable metals, e.g., gold and silver, from sulfide ore, transitional ore, and combinations and variations of these, and other ores.

The system has a primary crushing segment or plant 100. The ore material is feed into and crushed by the primary crushing plant 100. The crushed ore is stored in crushed ore storage pile 101. The crushed ore is feed to a secondary crushing segment or plant 102 (preferably having both screens, e.g., screening apparatus, and crushers), and from the secondary crushing segment to a tertiary crushing segment or plant 103 (preferably having both screens, e.g., screening apparatus, and crushers), which produces a crushed ore storage pile 104. Ore from the crushed ore storage pile 104 is feed to the heap leach segment 106. There is a "carbonate assisted oxidation and mitigation" handling and distribution segment 107. There is a metal recovery segment 108 for recovering the metal from the solution leaving the heap leach segment 106.

The carbonate assisted oxidation and mitigation reagent is trona (trisodium hydrogendicarbonate dihydrate, sodium sesquicarbonate dihydrate, $Na_2CO_3 \cdot NaHCO_3 \cdot 2H_2O$), soda ash (sodium carbonate, $Na_2CO_3$), bicarbonate ($NaHCO_3$), and combinations of these, and other oxidizing agents. In an embodiment the carbonate assisted oxidation and mitigation reagent is at least about 60% soda ash, at least about 80% soda ash, 95% soda ash, and 100% soda ash.

It being understood that in embodiments, one or more of the segments may be combined into a single segment or plant.

Example 10A

The crushing system 100, in the precious metal from ore recovery system of Example 10 and FIG. 4, runs at a nominal capacity of from about 30,000 stpd to about 100,000 stpd, from about 40,000 stpd to about 80,000 stpd, about 60,000 stpd, about 70,000 stpd, and all values within these ranges, as well as larger and smaller amounts. Pit ore is routed to the primary crusher dump pocket via haul truck where it is crushed to 7" (inch). Prior to the primary crusher each truck being routed is passed under a carbonate assisted oxidation and mitigation material silo where a pre-determined amount of dry material is be added to the ore. For example, trona or soda ash is added to the ore in each truck prior to the crushing system. The ore is processed through three stages of crushing to exit the tertiary crushers at a nominal P80 crush size of approximately 0.5 inch depending on the ore routing. The crushed ore is then stacked for use or application on the heap leach pads in the leach pad segment 106.

Example 10B

Pre-oxidation of sulfide ore, transition ore or both (preferably crushed to about 0.5"), in the precious metal ore recovery system of Example 10 and FIG. 4, begins at the crushers using in-situ moisture and carbonate assisted oxidation and mitigation material. The carbonate assisted oxidation and mitigation material requirement for the ore is relative to the percent sulfide-sulfur content of the ore. Typically, the average carbonate assisted oxidation and mitigation material consumption is from about 5 lbs per ton to about 50 lbs per ton, from about 10 lbs per ton to about 40 lbs per ton, about 15 lbs per ton to about 25 lbs per ton, about 15 lbs per ton, about 20 lbs per ton, about 25 lbs per ton, and all values within this range, as well as longer and smaller amounts.

Once ore has been placed on the heap leach of segment 106, additional carbonate assisted oxidation and mitigation material solution will be applied to bring the ore to field capacity (about 8-10% moisture). The solution in the heap will be replenished on a regular basis using carbonate assisted oxidation and mitigation material solution in order to offset evaporation and carbonate consumption. For example, a trona or soda ash solution is added to the leach heap on a regular basis. Carbonate assisted oxidation and mitigation material solution is pumped through a separate system of pipes or tubing from the lixiviant solution system.

Pre-Oxidation duration can be determined by the characteristics of the ore and the measured extent of oxidation based upon sulfate production. To achieve metal recoveries or about 70% or greater, it is preferable to have at least about 45% oxidation prior to completion of the pre-oxidation stage. Typically, ore can take between 90 and 120 days to complete pre-oxidation.

Generally, in the system of Example 10 and FIG. 4, the pre-oxidation step is from the crusher 100 (or the haul truck where material is added to the ore) to the crushed pile 104. It being understood that carbonate assisted oxidation and mitigation material as dry or in aqueous solution can be added at other points between the crusher 100 and the crushed pile 104, as part, of the pre-oxidation step.

Example 10C

Ore that has undergone a pre-oxidation cycle is rinsed, preferably with a saturated lime solution prior to the commencement of cyanidation leach. Saturated lime solution is applied to panels that have undergone pre-oxidation at a rate of from about 0.0005 to about 0.0100 liters/min*$m^2$, from about 0.0010 to about 0.0050 liters/min*$m^2$, about 0.0025 liters/min*$m^2$, all values within these ranges, until about one pore volume has been displaced, about 1.5 pore volumes have been displaced, about two pore volumes have been displaced, about 2.5 pore volumes have been displaced, combinations and variations of these, and all values within these ranges. This rinse removes the bicarbonate from the heap and prevent cyanide loss during leaching.

Preferably, alkalinity of the solution in the heap is monitored to ensure rinse completion prior to the start of cyanidation.

Rinse solution can be supplied using the same piping that delivers lixiviant during the leach phase or can be supplied using a separate or independent system.

Example 10D

Typically, cyanidation conditions for ore can be the same regardless of crush size or the use of pre-oxidation. The duration that these conditions are maintained is dependent on the category to which the ore belongs. The cyanide concentration of from about 0.5 lbs/ton to about 3.5 lbs/ton, about 0.75 lbs/ton to about 2.25 lbs/ton, about 1 lb/ton to about 2 lbs/ton, about 1.5 lbs/ton, and all values within these ranges, as well as large and smaller amounts, of solution will be maintained. The pH is be controlled using lime.

Example 10E

Oxide and transition ore material can be leached as ROM (run of mine) and in this manner it can proceed directly from the pit to the heap. Cyanide leaching can begin without undergoing pre-oxidation or rinse. A small percentage of oxide and transition material will be directed to the crushing plant to be reduced to a P80 of about 0.75" before being stacked and commencing cyanide leach.

Transitional and oxide ore materials undergo a 200-day primary leach cycle using a 3:1 solution to ore ratio and an application rate of 0.0025 liters/min*$m^2$.

Sulfide material ore and a portion of the transition material ore are reduced to a P80 of 0.5" before undergoing the pre-oxidation and rinse processes on the heap. At the conclusion of the rinse a 100-day primary leach cycle will begin. A 1.5:1 solution to ore ratio and an application rate of 0.0025 liters/min*$m^2$ is used.

Example 10F

Gold, silver and both, are recovered from the pregnant solution taken from the heap leach through any conventional means known to the art.

Example 10G

The metal recovery segment can be any known systems devices or process for the separation of metal from metal complexes, slurries, and solutions. For ores, and thus pregnant solutions with high silver content, gold and silver can be recovered by zinc cementation. In the system of Example 10, FIG. 4, Merrill-Crowe plants 108, process the pregnant solution from the heap leach operation. These plants can have a capacity of from about 2,000 gpm to about 40,000 gpm, from about 4,000 gpm to about 30,000 gpm, from about 3,000 gpm to about 25,000 gpm, about 5,000 gpm, about 20,000 gpm, about 30,000 gpm, and all values within these ranges, as well as larger and smaller values.

In an embodiment of this example, wet filter cakes from the low-grade and high-grade Merrill-Crowe circuits are transferred to retort pans, which are then put into a retort furnace to remove water and mercury. Water and then mercury are sequentially volatilized from the precipitate by heating the precipitate under a partial vacuum. The exhaust gases pass through multiple stages of condensers that drain mercury and water to a collection vessel. The retorts are typically operated batch-wise, with a cycle time of approximately 18 hours. The dried filter cake is mixed with flux and then transferred to an electric arc furnace where it is smelted to produce dore.

Example 11

In embodiments sodium sulfate, sodium bicarbonate and combinations of these build up to a steady state in the reclaimed water. In some embodiments, sulfate ions in water systems, make up water, can slow down the sulfide oxidation reaction. These can be addressed by increasing oxidation times. Preferably, these can be addressed and mitigated by fresh water addition to the soda ash recycle pond to optimize, and preferably maximize the dilution of sulfate and bicarbonate ions in the pre-oxidation water circuit.

Example 12

In an embodiment the heap, in a precious metal from ore recovery system, such as the system of Example 10, FIG. 4, processes, one, two, three, four, five or more different categories of ore. These categories of ore include, for example, all metalliferous sulfide ores Example 13

In an embodiment the heap, in a precious metal from ore recovery system, such as the system of Example 10, FIG. 4, processes three different categories of ore.

Ore Category 1 (ROM ore)—low-grade ore with high cyanide soluble gold is cyanide leached to extract gold and silver. This accounts for from about 1% to about 50%, and all values within this range, or more, of the ore over the life of mine. The gold contents are highly soluble and the remaining refractory gold contents typically do not justify the time and expense of a pre-oxidation step, therefore it will be stacked as 'ROM'. The ore in this category is typically referred to as, ROM ore, ROM 'oxide' or ROM 'transition'.

Ore Category 2 (¾" Crushed ore)—high-grade ore with high cyanide soluble gold is crushed to a P80 of ¾" and cyanide leached to extract gold and silver. This accounts for about 1% to about 50%, and all values within this range, or more, of the ore over the life of mine. The gold contents are highly soluble, and additional size reduction is expected to increase gold and silver recovery enough to justify the additional expense. The remaining refractory gold contents are not projected to justify the time and expense of a full pre-oxidation cycle. The ore in this category is typically defined as ¾" Crushed 'oxide' or 'transition'.

Ore Category 3 (½" Crushed ore)—low cyanide soluble ratio ores are crushed to a P80 of ½". The crushed ore is mixed with soda ash, trona or a mixture of both, to induce an alkaline 'pre-oxidation' process. After the oxidation process has been completed to the desired extent, the ore will be 'rinsed' with saturated lime solution and then cyanide leached to extract gold and silver. This accounts for about 40% to about 95%, and all values within this range, and more, of the ore over the life of the mine. The ore in this category is typically defined as ½" Crushed 'sulfide' or 'transition'

Example 14

In an embodiment the heap, in a precious metal from ore recovery system, such as the system of Example 10, FIG. 4, processes three different categories of ore.

Ore Category 1—low-grade ROM ore (oxide, transition, or both) with high cyanide soluble gold is cyanide leached to extract gold and silver. This accounts for from about 0% to about 10%, and all values within this range, of the ore over the life of mine. A pre-oxidation step is typically not used for this ore.

Ore Category 2—high-grade ¾ Crushed ore (oxide, transition, or both) with high cyanide soluble gold is crushed to a P80 of ¾" and cyanide leached to extract gold and silver. This accounts for about 0% to about 10%, and all values within this range, of the ore over the life of mine. A pre-oxidation step is typically not used for this ore.

Ore Category 3—low cyanide soluble Crushed (sulfide, transition, or both) ratio ores are crushed to a P80 of ½". The crushed ore is mixed with soda ash, trona or a mixture of both, to induce an alkaline 'pre-oxidation' process. After the oxidation process has been completed to the desired extent, the ore will be 'rinsed' with saturated lime solution and then cyanide leached to extract gold and silver. This accounts for about 5% to about 95%, and more, and all values within this range, of the ore over the life of the mine.

Example 15

To determine a base line for comparison purposes, direct cyanidation leach of bulk samples of transitional and sulfide ore are conducted. Samples are ground to a P80 of 325 mesh for this testing. Recoveries from Domain Beta ore and Domain Gama ore, are in the mid-20% range for gold and 80% range for silver, while other types of sulfide or transition ore have recoveries ranging from 45 to 50% for gold and 55 to 83% for silver. These results can be compared to the pre-oxidation and oxidation results (e.g., as provided in this Specification), which shows the significant improvement in gold recovery from using this process. And, also an improvement in the silver recovery from using this process.

A measure of recovery by direct cyanidation is the ratio of cyanide soluble metal to the total assay of the metal, that is, AuCN/AuFA and AgCN/AgFA.

Example 16

Figure 5A:
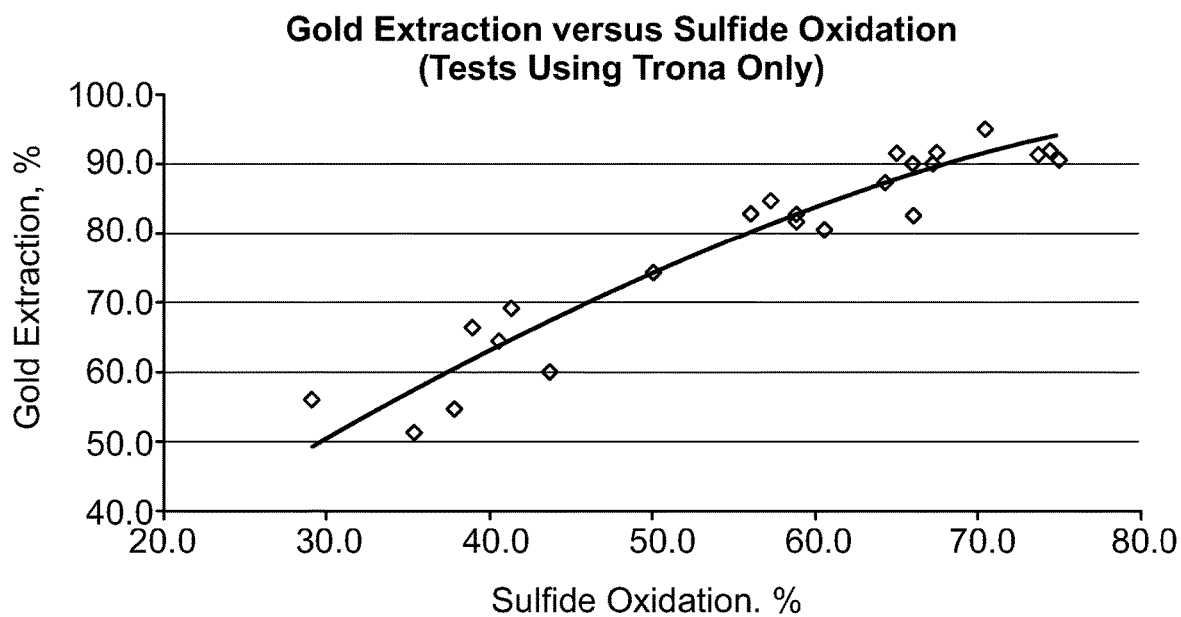
FIG. 5A is a chart showing an embodiment of percentage gold recovery vs percentage oxidation, from trona applications, in accordance with the present inventions.
Figure 5B:
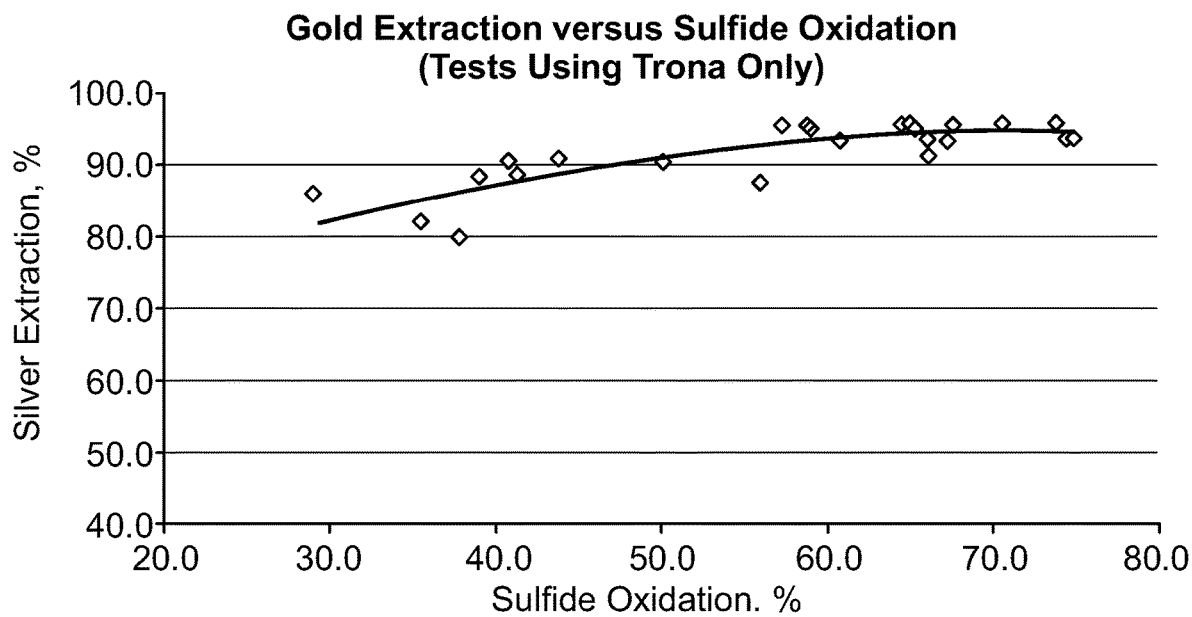
FIG. 5B is a chart showing an embodiment of percentage silver recovery vs percentage oxidation, from trona applications, in accordance with the present inventions.

Turning to FIGS. 5A and 5B, results of batch oxidation tests using trona are shown. These tests show that full oxidation is not required to attain high recoveries in subsequent cyanide leaching. About 85% of the gold and 92% of the silver can be recovered by cyanidation if 60% of the sulfide-sulfur content in the concentrate is oxidized For some ores, and embodiments, reaction kinetics are improved by higher temperatures up to 75° C. Higher reaction temperatures (around 90° C.) can result in slower oxidation kinetics, (it is theorized, perhaps due to the decreased oxygen solubility in the laboratory bench-scale setting).

Example 17

Figure 6:
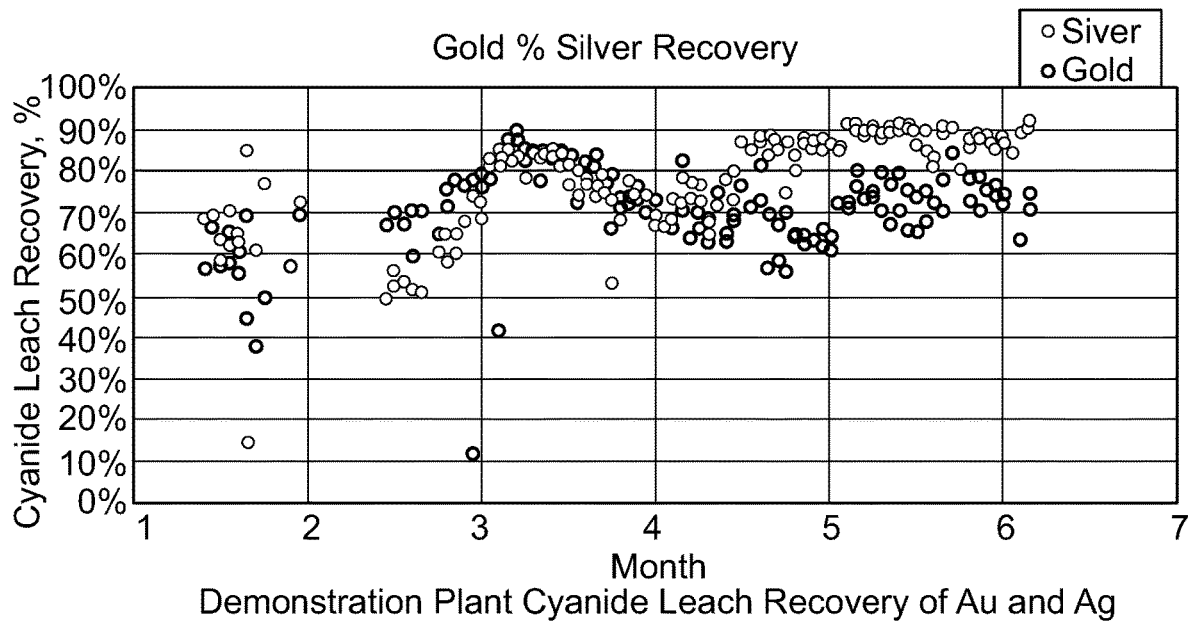
FIG. 6 is a chart showing an embodiment of percentage gold and silver recovery from an oxidation-leach recovery system, in accordance with the present inventions.

Turning to FIG. 6 there is shown a graph of the recovery from a pilot plant oxidation-leach recovery system A continuous oxidation pilot plant is run using the same three sulfide domains used in the batch tests of the other Examples. The tests are conducted on each ore type are run separately in order to determine any operating differences between them and on a composite that is made up of material from all types. The pilot plant tests were run using 600 lb of trona per ton of concentrate, at 75° C., 25-micron grind size, 20% solids and 48 hours total residence time. Different material types oxidized at varying rates, with Domain Gama materials oxidizing the fastest followed by Domain Delta and then Domain Beta. The Master Composite oxidation rate was comparable to Domain Beta.

Gold recovery versus sulfide oxidation is: 80% gold recovery achieved at 50% sulfide oxidation for all material types; and 87% gold recovery achieved at 60% sulfide oxidation for all material types Once the ore concentrates (e.g., about 40% solids and the trona concentration is approximately 20%) are oxidized, gold and silver recoveries are significantly improved over the direct cyanidation recoveries. The results of cyanide leaching of oxidized concentrate are shown on FIG. 6 as recovery of gold and silver during 7 months of plant operation. The graph starts with Domain Delta concentrate and then switches to Domain Beta concentrates on month 4. Recovery of gold and silver from Domain Delta concentrate peak at around 85%. Gold recovery from Domain Beta reaches 80 percent while silver recoveries from Domain Beta peaked at 90%. The general shape of the lines roughly follows the degree of oxidation of the concentrate.

Example 18

Oxidation and cyanide leach tests are conducted in plexiglass cylindrical columns that are 1 ft diameter and 4 ft high. Ore samples are crushed to ½ inch, blended and loaded into the columns.

Oxidation and leaching are performed in sequence in order to separate cyanide from the carbonate solutions. Contact between cyanide and bicarbonate results in losses in cyanide, thereby increasing the cyanide consumption.

Oxidation is performed for 60, 90 or 120 days by adding trona to the ore column and applying just enough solution to the column to keep the ore wet. Only enough solution drains at the bottom of the column to use for conditions measurement. This status is maintained to ensure that the interstices in the ore column are filled with oxygen-supplying air and not flooded with solution. A 50-ml sample is collected each day for pH and sulfate analysis. Oxidation is tracked by the amount of sulfate produced.

At the end of the oxidation cycle, the column is rinsed to recover sulfate held in the column and to wash down as much carbonate and bicarbonate out of the column as possible. This is followed by a lime water rinse, which will ensure that any remaining carbonate is precipitated as $CaCO_3$. The column then undergoes a standard cyanide column leach.

Example 18A

Figure 8A:
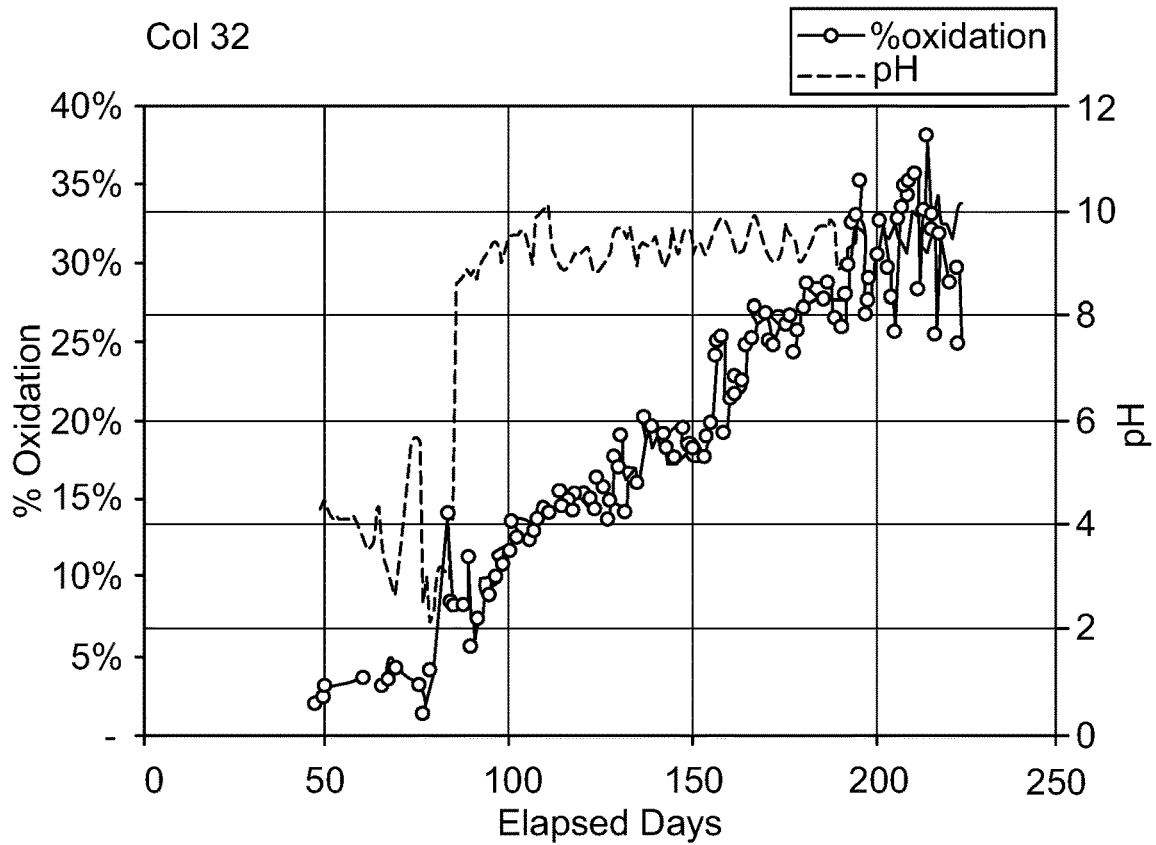
FIG. 8A is a chart showing an embodiment of the elapsed time in days vs percentage oxidation of a sulfide ore in accordance with the present inventions.
Figure 8B:
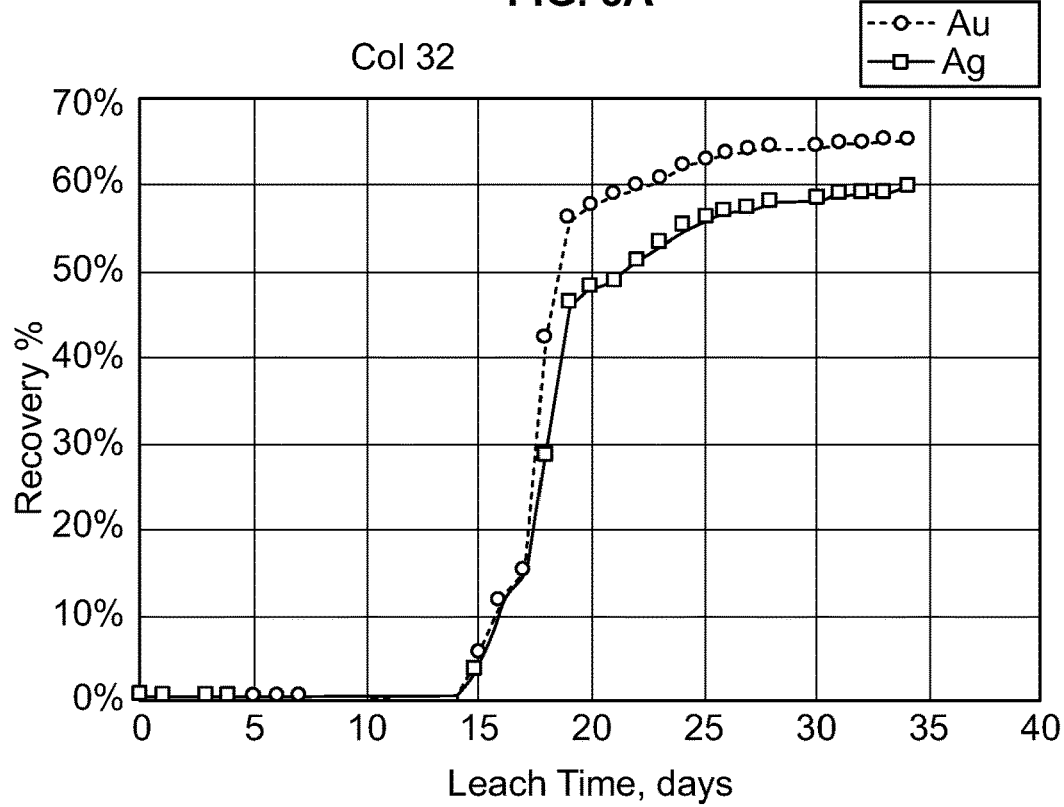
FIG. 8B is a chart showing an embodiment of the leach time in days vs recovery of gold and silver for a sulfide ore in accordance with the present inventions.

Following the method of Example 18, FIG. 8A shows the elapse time in days vs percentage of oxidation and FIG. 8B shows gold and silver recovery based on leach time for a Domain Alpha sulfide sample. Superimposed on the oxidation curve is the running pH of the solution. The plot shows that oxidation is slow in the beginning because there was not enough alkalinity present. Once the pH is increased, the oxidation reaction proceeds steadily until the column was rinsed. Once the ore is oxidized, gold and silver leached very quickly, which in this column took about 10 days to be essentially complete.

Example 18B

Figure 9:
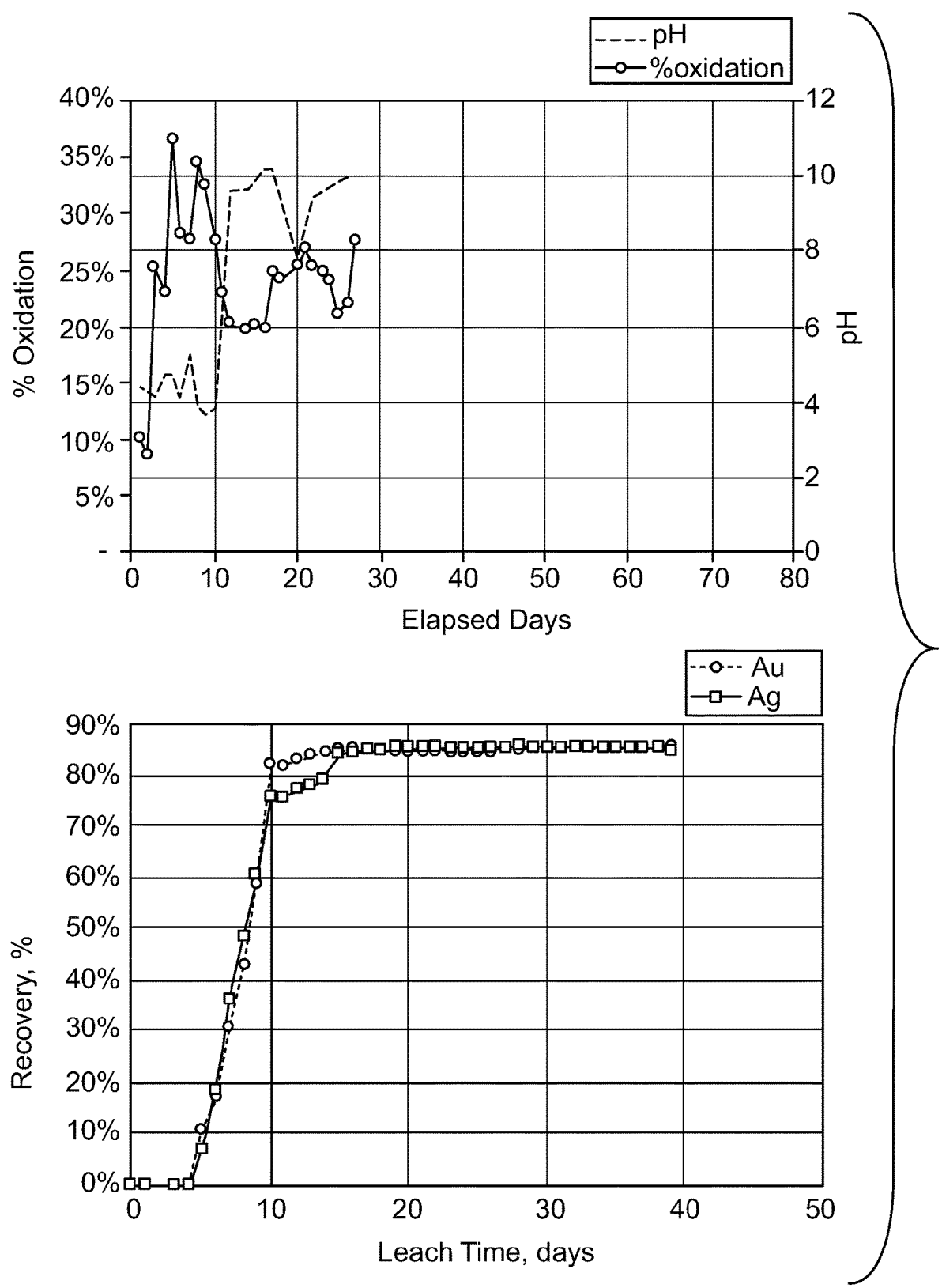
FIG. 9 is a pair of charts showing percentage oxygen vs elapse days and percentage recovery vs leach time for an embodiment of an oxidation-leach recovery methods in accordance with the present inventions.

Following the method of Example 18, FIG. 9 shows the elapse time in days vs percentage of oxidation and shows gold and silver recover based on leach time for a Domain Delta sulfide sample. Superimposed on the oxidation curve is the running pH of the solution. Once the ore is oxidized, gold and silver leached very quickly, which in this column took about 10 days to be essentially complete.

Sample of sulfide ore column 43 (FIG. 9) obtained gold and silver recoveries of 70% or better, after oxidation for 60 days and achieving this leach recoveries in less than 10 days. After 10 days the leaching recovery leveled out at about 80%.

Example 18C

Figure 10:
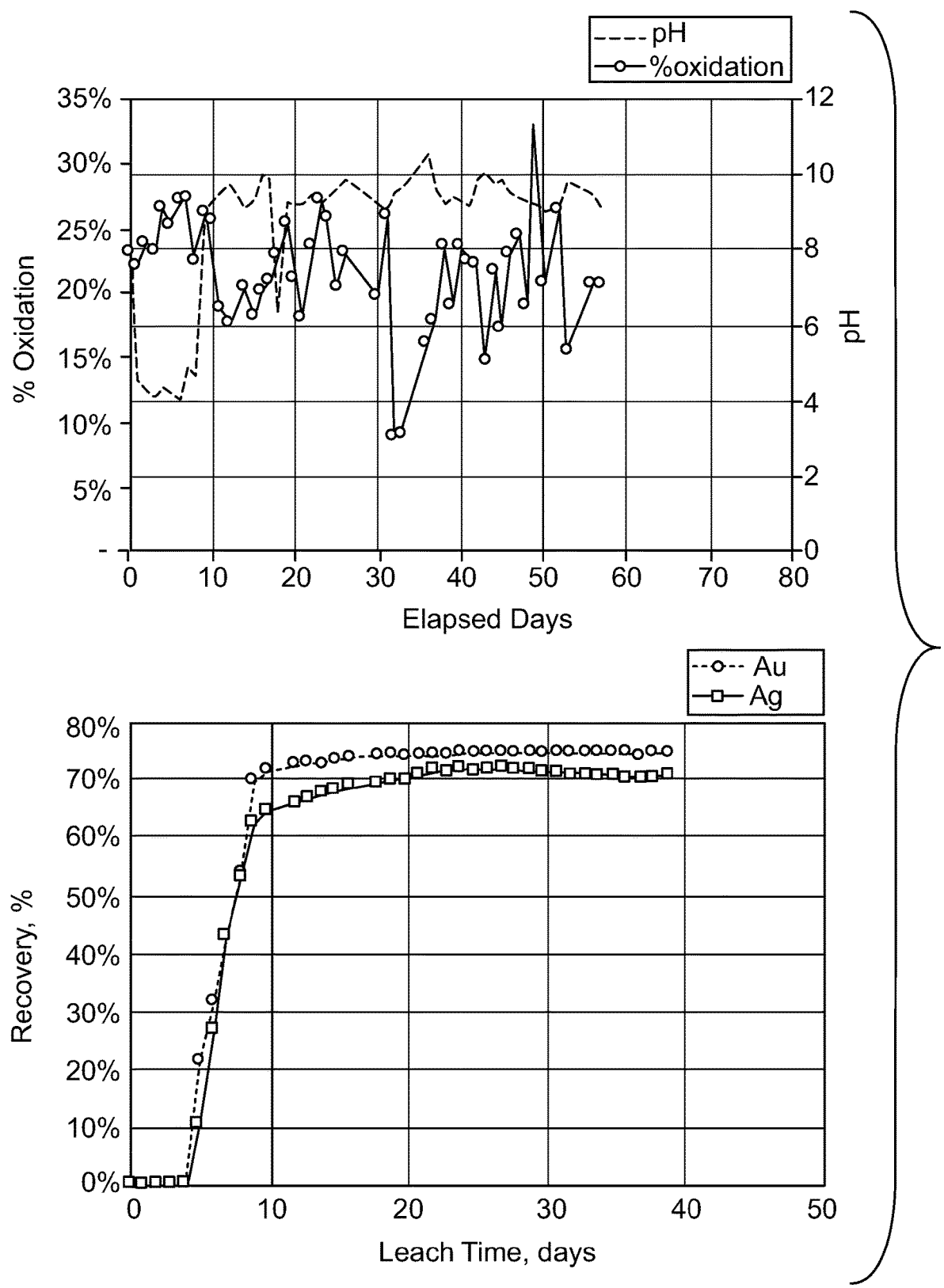
FIG. 10 is a pair of charts showing percentage oxygen vs elapse days and percentage recovery vs leach time for an embodiment of an oxidation-leach recovery methods in accordance with the present inventions.

Following the method of Example 18, FIG. 10 shows the elapse time in days vs percentage of oxidation and shows gold and silver recovery based on leach time for a Domain Delta sulfide sample. Superimposed on the oxidation curve is the running pH of the solution. Once the ore is oxidized, gold and silver leached very quickly, which in this column took about 10 days to be essentially complete.

Sample of sulfide ore columns 44 (FIG. 10) obtained gold and silver recoveries of 70% or better, after oxidation for 60 days and achieving the leach recoveries in less than 10 days.

Example 18D

Figure 11:
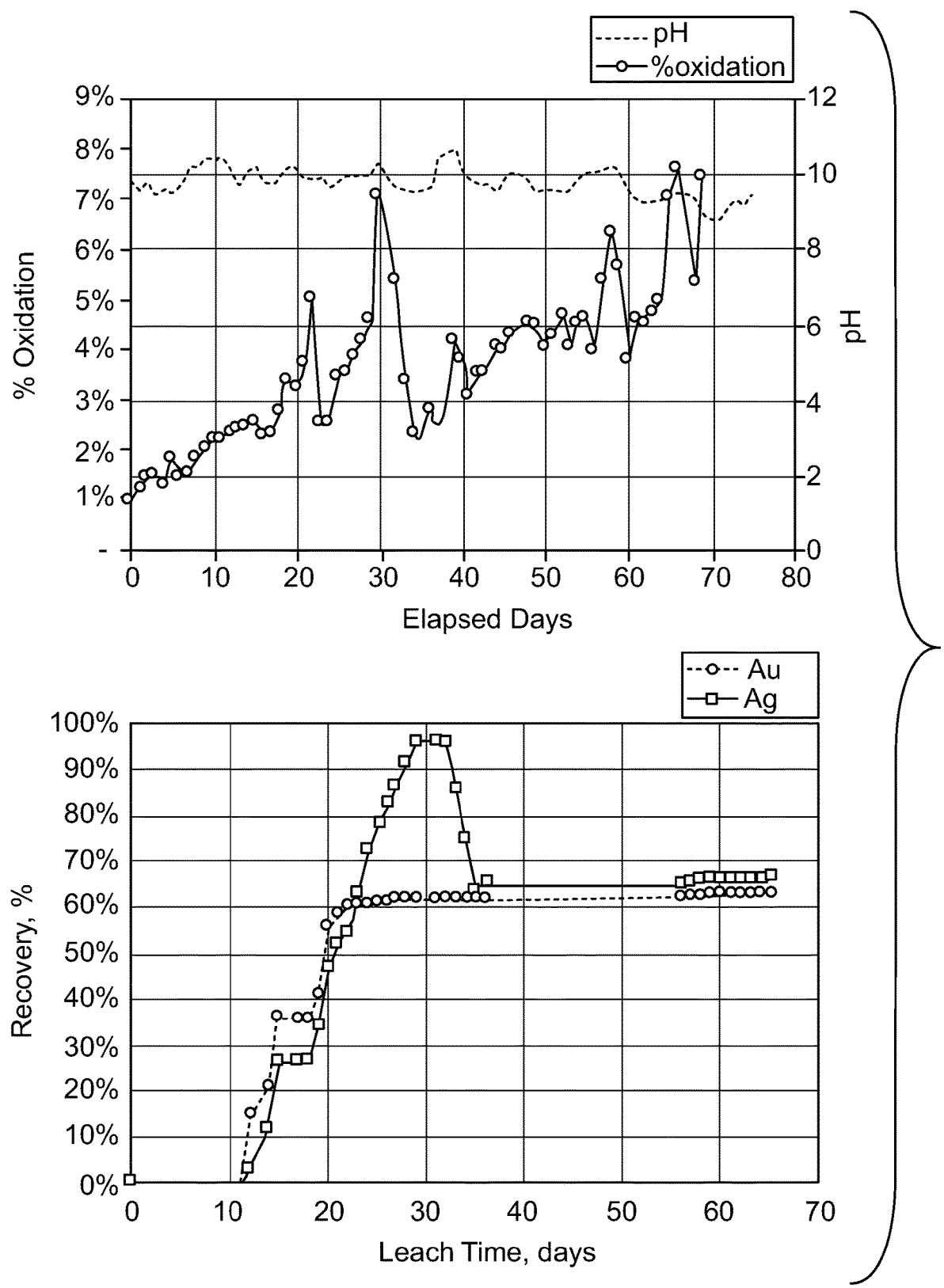
FIG. 11 is a pair of charts showing percentage oxygen vs elapse days and percentage recovery vs leach time for an embodiment of oxidation-leach recovery methods in accordance with the present inventions.

Following the method of Example 18, FIG. 11 shows the elapse time in days vs percentage of oxidation and shows gold and silver recover based on leach time for a Domain Beta sulfide sample. Superimposed on the oxidation curve is the running pH of the solution. Although the Domain Beta sample achieved a lower apparent oxidation, it nevertheless resulted in gold and silver recoveries over 60%.

Example 18E

Figure 12:
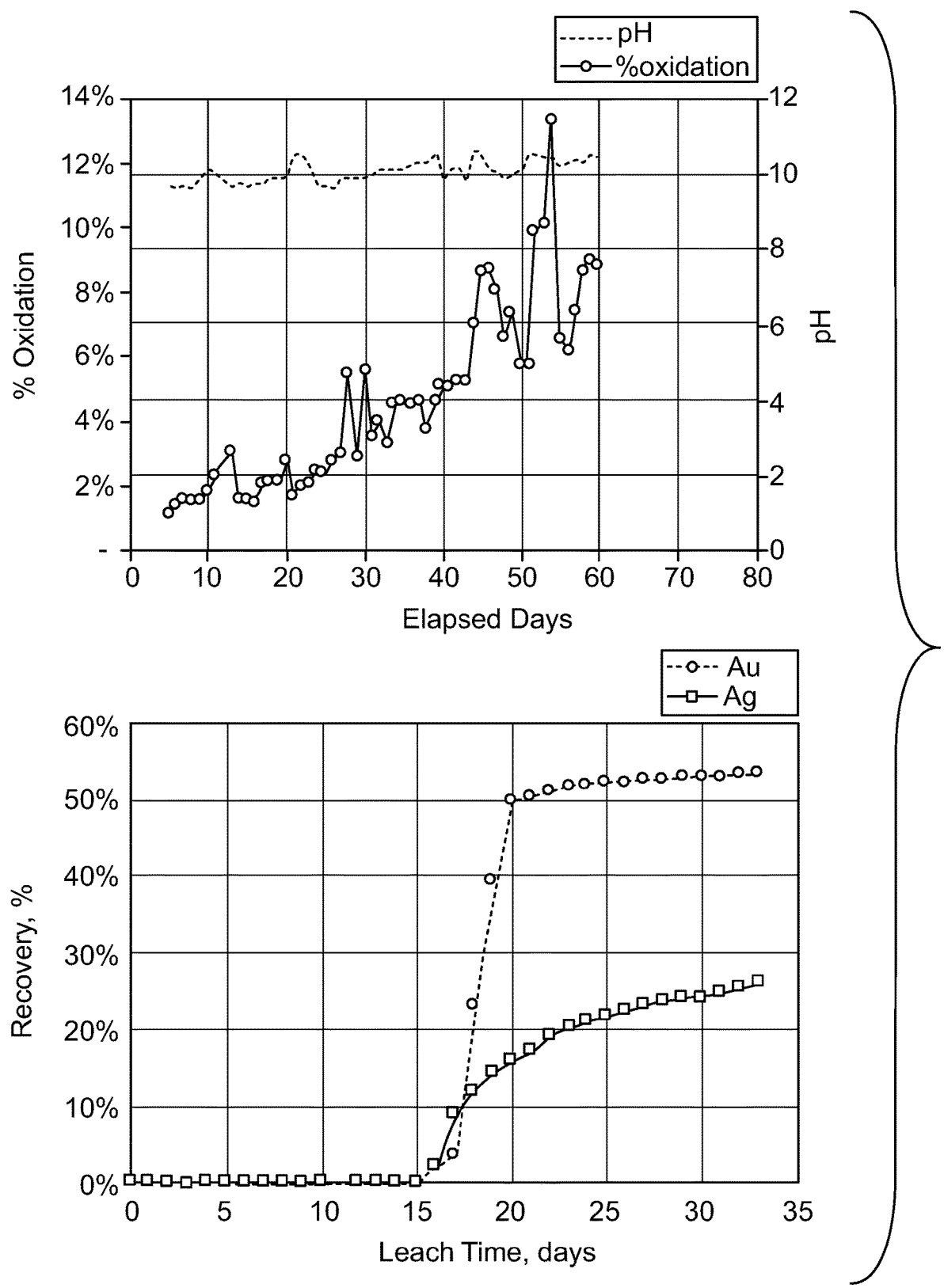
FIG. 12 is a pair of charts showing percentage oxygen vs elapse days and percentage recovery vs leach time for an embodiment of oxidation-leach recovery methods in accordance with the present inventions.

Following the method of Example 18, FIG. 12 shows the elapse time in days vs percentage of oxidation and shows gold and silver recovery based on leach time for a Domain Beta sulfide sample. Superimposed on the oxidation curve is the running pH of the solution. Although the Domain Beta sample achieved a lower apparent oxidation, it nevertheless resulted gold and silver recoveries over 60%.

Example 18F

Figure 13:
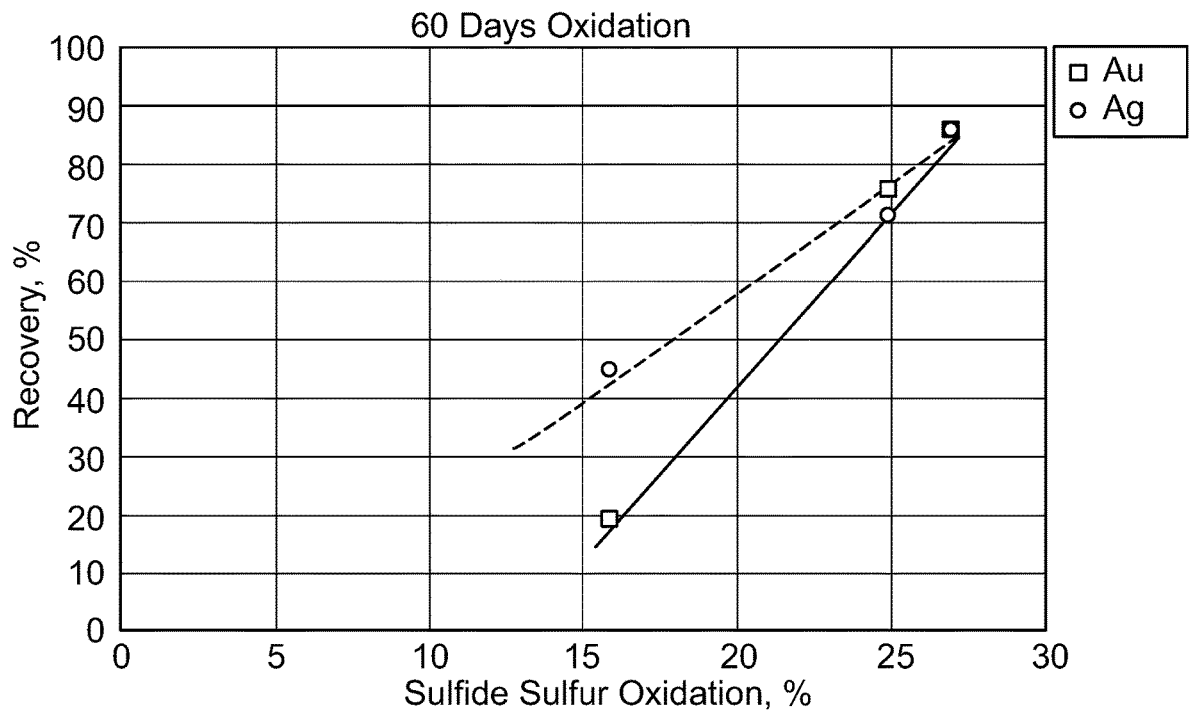
FIG. 13 is a chart showing percent recovery vs percentage sulfur oxidation for an embodiment of an oxidation-leach for oxidation-leach recovery methods in accordance with the present inventions.
Figure 14:
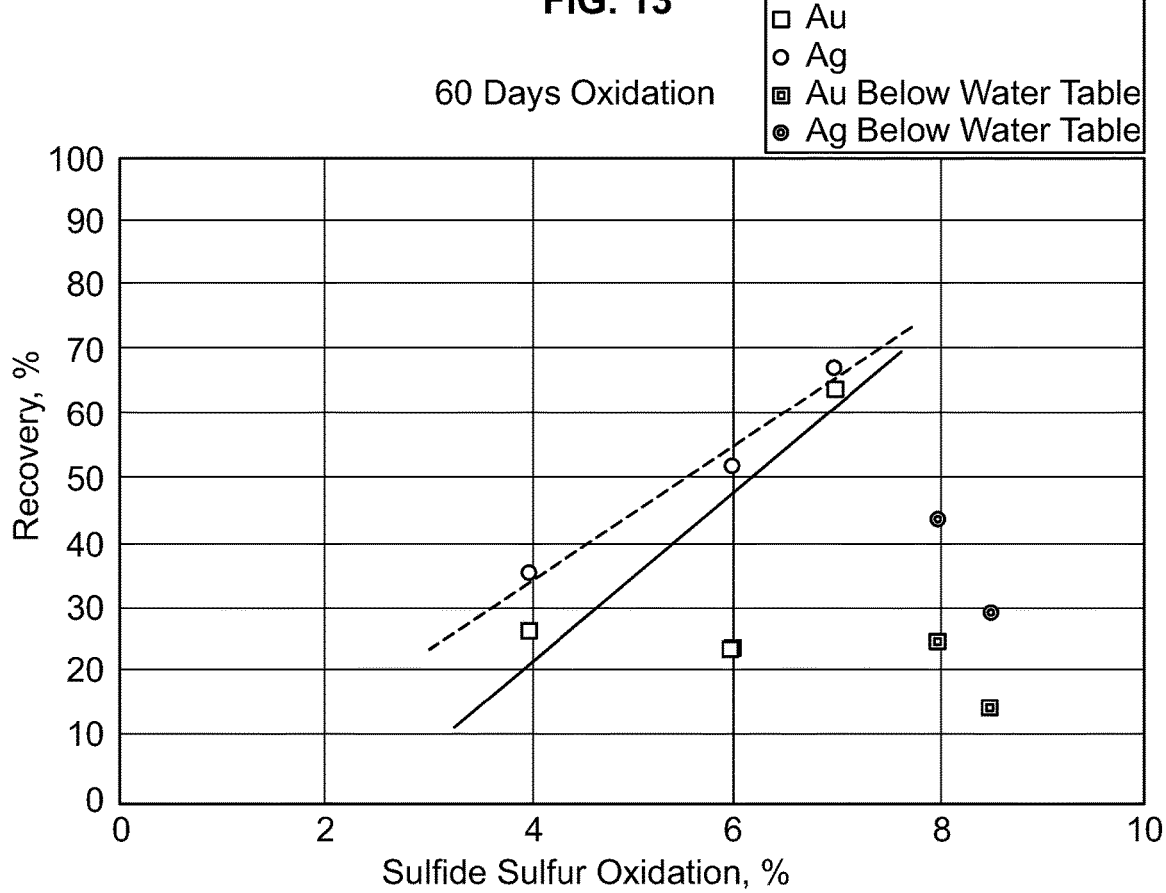
FIG. 14 is a chart showing percent recovery vs percent oxidation for an embodiment of an oxidation-leach for oxidation-leach recovery methods in accordance with the present inventions.

In embodiments following the method of Example 18, the column oxidation followed by leach tests, in general show that higher oxidation levels can produce better gold and silver recoveries in the subsequent cyanide leach process. Thus, FIG. 13 for Domain Delta and FIG. 14 for Domain Beta ores illustrate the effect of higher oxidation levels.

Example 18G

In embodiments following the method of Example 18, the column tests on Domain Alpha ores are conducted with lower levels of trona than in Examples 18A-F. At these lower trona amounts, the pH lingered at low values for about 80 days before more trona was added to take the pH up closer to 10, which may have resulted in the undesirable formation of jarosites. In spite of that, the maximum recoveries obtained are up to about 60% for both gold and silver.

Example 18H

Figure 15:
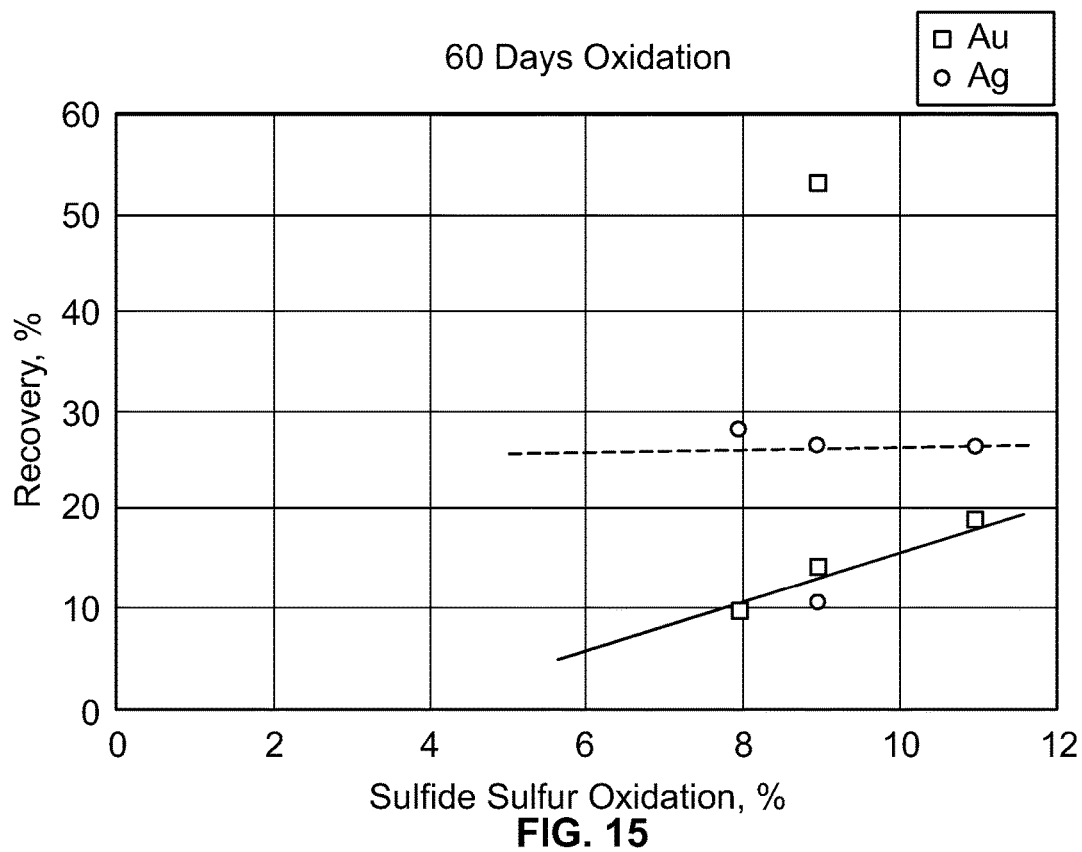
FIG. 15 is a chart showing percent recovery vs percent oxidation for an embodiment of an oxidation-leach for oxidation-leach recovery methods in accordance with the present inventions.

Turning to FIG. 15 there is shown the effect of increased oxidation on recovery of gold and silver at lower oxidation levels.

Example 19

Typical cyanide leach operations require the addition of two chemical agents to produce gold and silver. Embodiments of the present pre-oxidation and leach process (e.g., oxidation-leach recovery method) is dependent on the successful utilization of three reagents. In addition to Sodium cyanide and lime, the proposed process must include a carbonate source. In a testing program, either Trona or Soda Ash were used as carbonate sources during the pre-oxidation cycle of each test.

Figure 16:
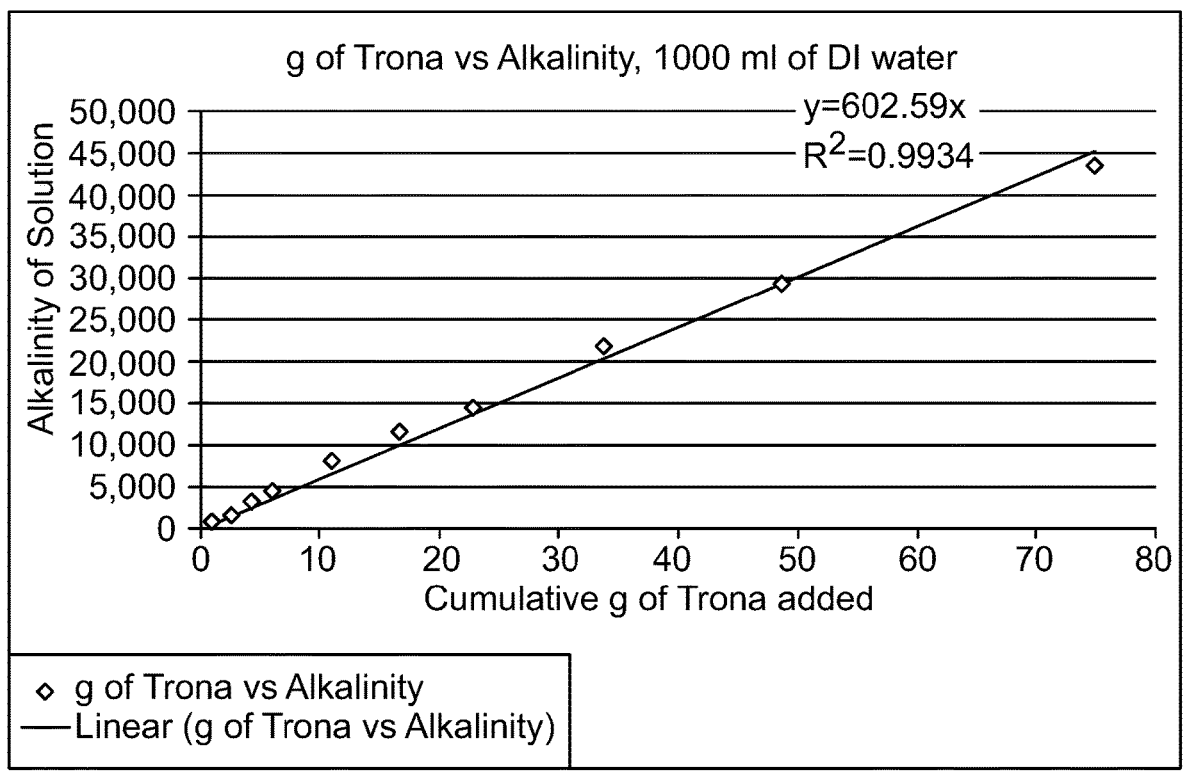
FIG. 16 is a chart showing an embodiment of alkalinity vs cumulative g of added, in accordance with the present inventions.

Both Trona and Soda Ash create dual alkaline systems in solution that allow carbonate concentrations to reach over 20,000 ppm. In embodiments trona was used during pre-oxidation to neutralize acid and maintain carbonate concentrations high enough to facilitate oxidation by preserving iron solubility. The relationship between Trona addition (g) and total alkalinity (ppm) was established in the laboratory such that alkalinity measurements could be converted into trona concentration by the following equation:

[Trona]=Total Alkalinity/602.59

Where Total Alkalinity' is the measured value in ppm and [Trona] is the resultant concentration in grams per liter. Data illustrating this relationship can be seen in FIG. 16.

Example 20

Figure 17:
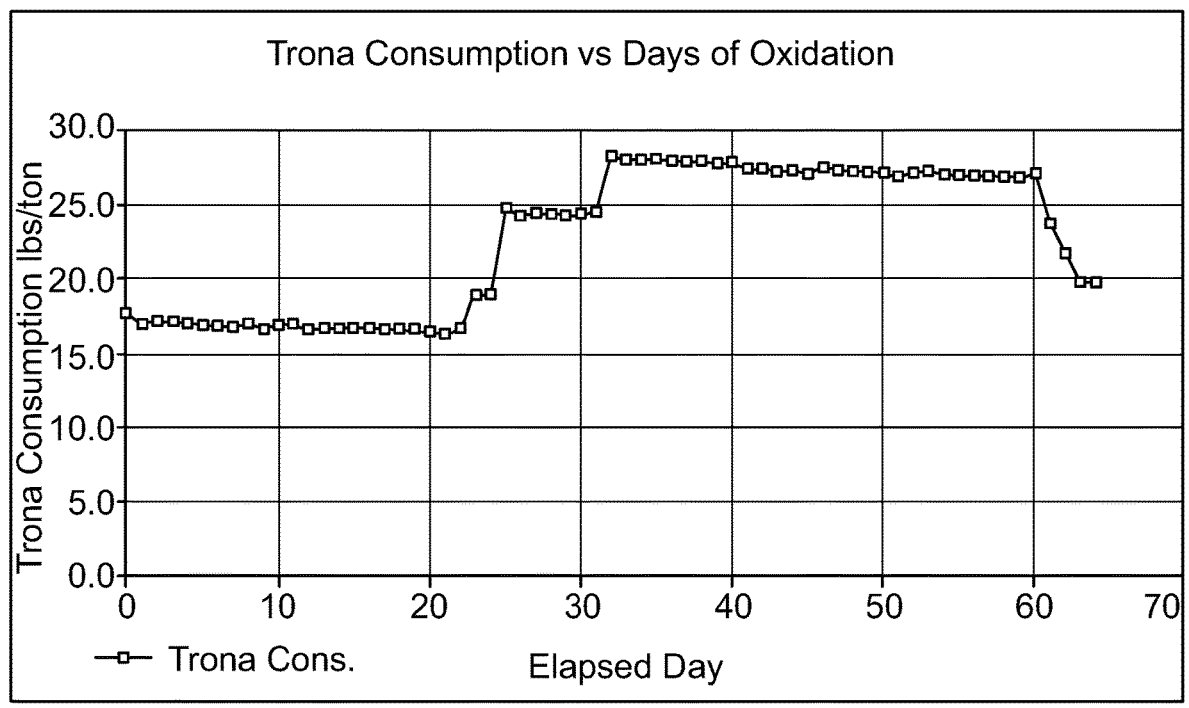
FIG. 17 is a chart showing trona consumption vs days for an embodiment of an oxidation-leach for oxidation-leach recovery methods in accordance with the present inventions.

It is theorized that for typical ores and heap operation, Trona Consumption≈% Sulfide*Extent of Oxidation*3,500. In an embodiment, the LOM average sulfide-sulfur content is 1.99% and the nominal oxidation target is 45%. According to calculated projections, 26-27 lbs/ton Trona are required per ton of pre-oxidized ore; all data generated in the lab indicates that only 26.5 lbs/ton Trona will be utilized. FIG. 17 illustrates data relating to trona consumption vs day of oxidation.

This figure above shows Trona consumption tracked for the entirety of a lab column pre-oxidation cycle. Addition is represented by steep jumps from one day to the next, small decreases in 'consumption' over time represent total alkalinity leaving the system as part of regular 50 ml sampling, and the steep decrease in consumption after 60 days of oxidation represents back-calculation of residual Trona during rinsing.

As acid is generated by the oxidation reaction, Trona will be 'consumed'. This consumption occurs when the carbonate or bicarbonate of Trona is converted to bicarbonate or carbon dioxide in order to neutralize the produced acid. Over time carbonate concentrations may need to be replenished, for example, either by the addition of more carbonate containing reagents, or by the addition of a hydroxide source that can convert bicarbonate to carbonate while raising the pH of the solution.

Example 21

In an embodiment soda ash is used as a source of carbonate instead of trona, as it can deliver higher carbonate concentrations than trona and requires less mass to be moved and stored in order to provide the same total alkalinity.

Example 22

Figure 18:
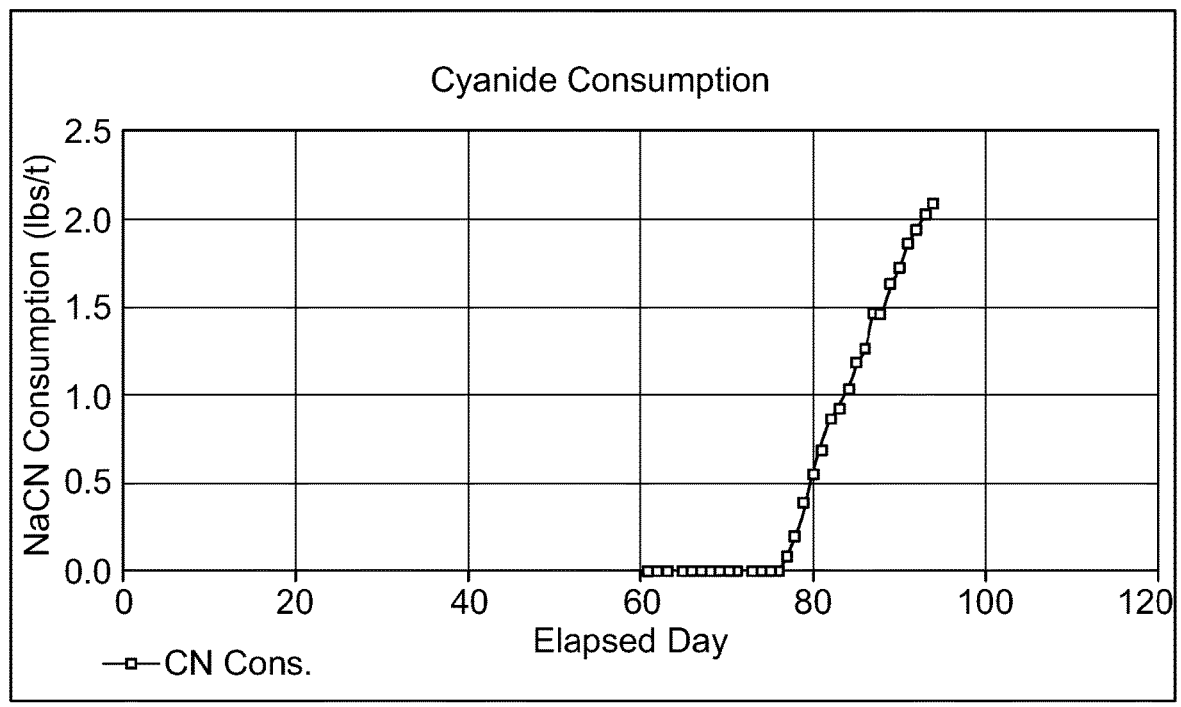
FIG. 18 is a chart showing cyanide consumption vs days for an embodiment of an oxidation-leach for oxidation-leach recovery methods in accordance with the present inventions.

Turning to FIG. 18 there is shown cyanide consumption for pre-oxidized sulfide ore. Cyanide is only added to the column at the conclusion of the rinse. Sodium cyanide is stabilized by manufacturers through the addition of Sodium hydroxide. A common composition for this reagent is a 30% solution of NaCN which will also contain 3% NaOH. In this embodiment the utilization of sodium cyanide solution to leach pre-oxidized ore is no different than its utilization when leaching ore that has not been pre-treated. Sodium cyanide loss is observed for solution systems that contain high amounts of bicarbonate; while the mechanism is unclear, at this time, experiments have shown the incompatibility of Trona and Sodium cyanide in solution. As a result, it it preferable to have process controls in place to separate carbonate containing solutions from cyanide containing ones.

Example 23

Figure 19:
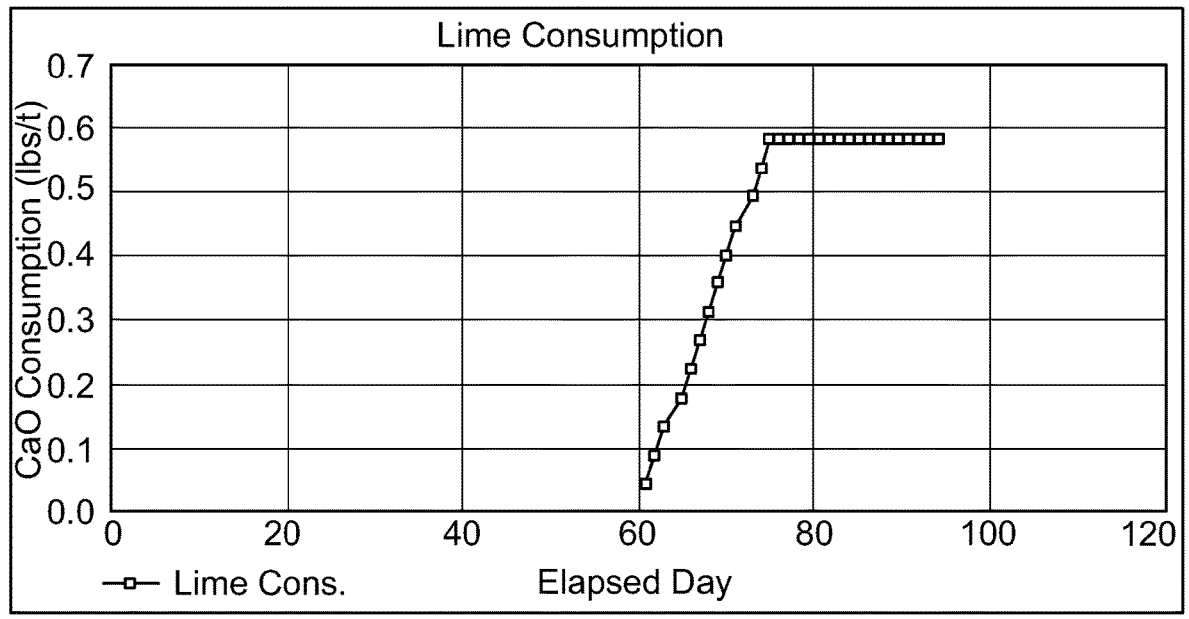
FIG. 19 is a chart showing lime consumption vs days for an embodiment of an oxidation-leach for oxidation-leach recovery methods in accordance with the present inventions.

Turning to FIG. 19 there is shown the lime consumption for an embodiment of the present two step oxidation leach process. Lime is coupled with Sodium cyanide to form the lixiviant solution that drives metal recovery during cyanidation. Lime acts as a hydroxide source in solution that maintains a high enough solution pH to prevent the loss of cyanide to HCN gassing. Lime offsets any additional acid generated during the leach cycle. In addition to its role in the lixiviant solution, saturated lime solution is used as a rinsing agent upon completion of the pre-oxidation cycle. Lime solution pushes out and dilutes carbonate solutions prior to the addition of cyanide to a panel. This lime solution is diverted to the carbonate solution ponds where it will serve to regenerate carbonate concentration from bicarbonate that has built up. The consumption of lime when used for the cyanidation of pre-oxidized ore is lower than when it is used to leach un-pretreated ore. The majority of lime addition/consumption is done during the rinse stage of the process. In embodiments, after cyanidation has commenced, additional lime is rarely used, as the NaOH provided by cyanide solution is able to neutralize residual acid generation and maintain pH.

Example 24

Figure 20:
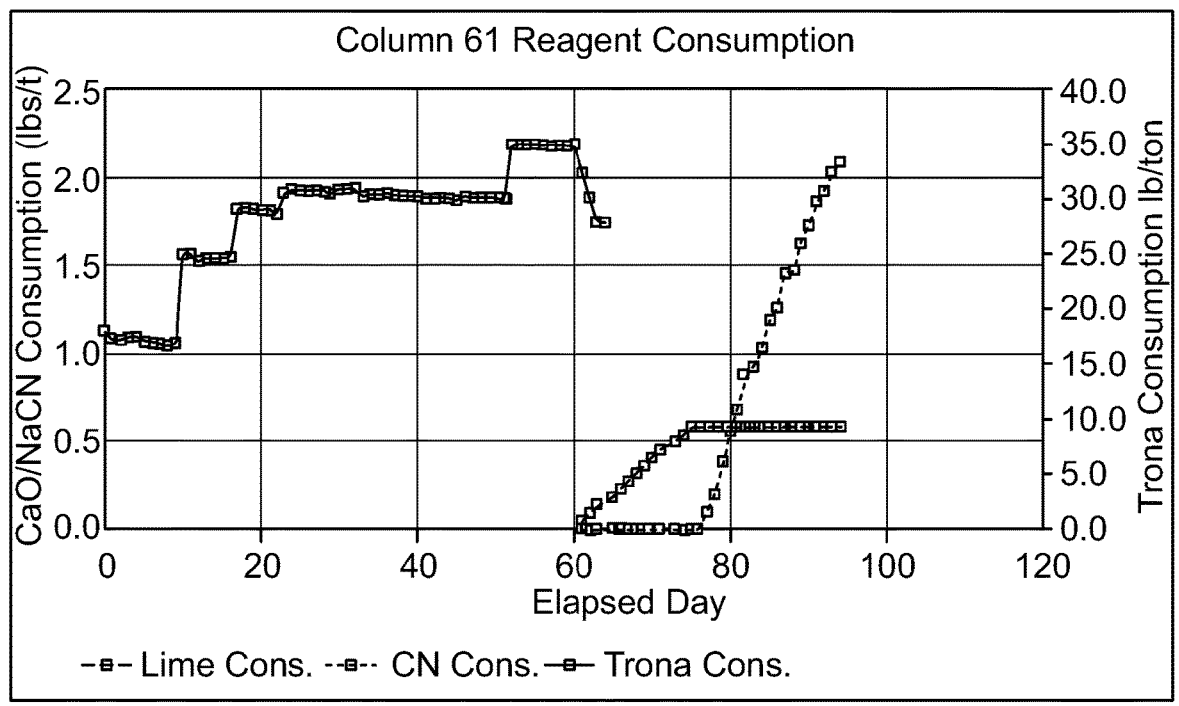
FIG. 20 is a chart showing reagent consumption vs days for an embodiment of an oxidation-leach for oxidation-leach recovery methods in accordance with the present inventions.

Turning to FIG. 20 there is shown the consumption of the three primary reagents for an embodiment of the two step oxidation leach process for sulfide ores.

Example 25

Figure 21:
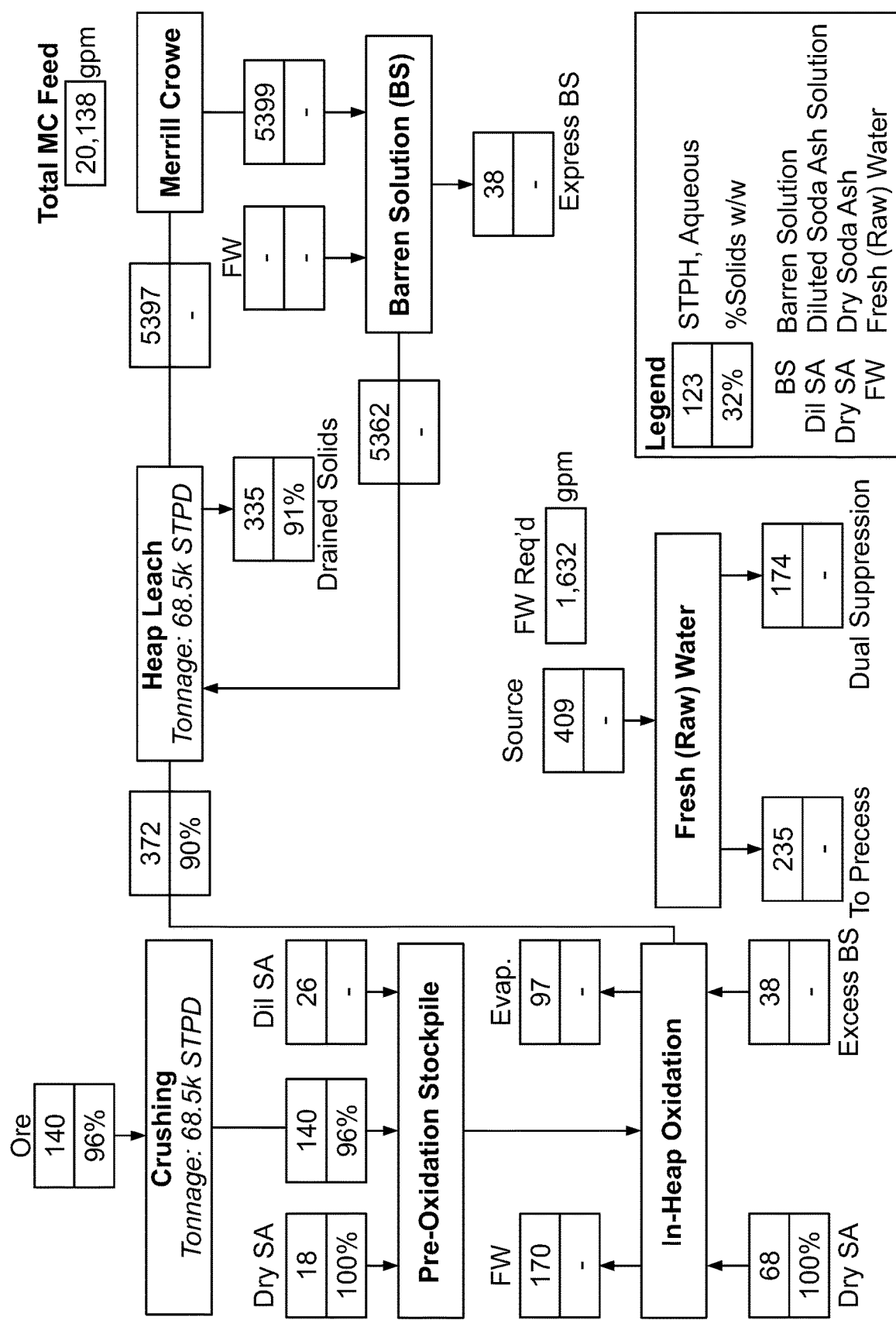
FIG. 21 is a schematic for an embodiment of a system and method for oxidation-leach recovery in accordance with the present inventions.

Turning to FIG. 21 there is shown a process flow and water balance for an embodiment of the present systems. The acronyms used in the Figure are: FW=fresh water, SW=seal water, PW=process water, BS=barren solution.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

The invention claimed is:

1. A system for a processing and recovery of metals from ores having 70% or less cyanide-soluble metal, the system comprising:
   a. a crushing segment comprising: (i) an ore comprising a metal and a sulfide; and, (ii) crushing equipment;
   b. a storage segment, the storage segment comprising an oxidizer and pH buffer material and a storage vessel configured to hold the oxidizer and the pH material;
   c. an oxidizing pH moderating material handling and distribution segment, the handling and distribution segment configured to receive the oxidizer and pH buffer material from the storage segment and comprising (i) the oxidizer and pH buffer material and (ii) handling and distribution equipment; wherein the handling and distribution segment is configured to meter and directly add the oxidizer and pH buffer material to the ore comprising a metal and a sulfide;
   d. the crushing segment, the pH moderating material handling and distribution segment, or both, configured to mix and conduct an oxidation reaction; whereby the sulfide is oxidized and thereby creating a pre-oxidized ore in the crushing segment, the handling and distribution segment, or both;
   e. a heap leach segment, comprising the pre-oxidized ore and a reagent for extracting the metal from the pre-oxidized ore, thereby forming a solution comprising the metal; and,
   f. a metal recovery segment, whereby the metal is recovered from the solution.

2. The system of claim 1, wherein the system is located at a surface mine in the earth.

3. The system of claim 1, wherein the ore comprises a sulfide ore.

4. The system of claim 1 wherein the ore comprises a transition ore.

5. The system of claim 2, wherein the ore comprises a sulfide ore.

6. The system of claim 2, wherein the ore comprises a transition ore.

7. The system of claim 1, comprising a holding pile of pre-oxidized ore, wherein the oxidation reaction continues in the holding pile.

8. The system of claim 1, wherein the ore consists essentially of a sulfide ore.

9. The system of claim 1, wherein the ore consists essentially of a transition ore.

10. The systems of claim 1, wherein the ore has a moisture content of from about 2% to about 10%.

11. The systems of claim 3, wherein the ore has a moisture content of from about 2% to about 5%.

12. The system of claim 7, wherein the pre-oxidized ore in holding pile has a moisture content of from about 2% to about 10%.

13. The system of claim 7, wherein the pre-oxidized ore holding pile has a moisture content of from about 2% to about 5%.

14. The systems of claim 1, wherein the ore has a density is about 40%.

15. The systems of claim 4, wherein the ore has a density of about 20% to about 60%, and all values within this range.

16. The system of claim 7, wherein the pre-oxidized ore in holding pile has a density of about 30% to about 50%.

17. The system of claim 1, wherein the metal recovery segment is a Merrill-Crowe plant.

18. The system of claim 1, wherein the metal recovery segment comprises a zinc cementation system.

19. The systems of claim 1, wherein the oxidizer and pH buffer material comprises trona.

20. The systems of claim 1, wherein the oxidizer and pH buffer material comprises soda ash.

21. The systems of claim 3, wherein the pre-oxidized ore has a P80 particle size of from about 0.25 inches to about 1 inch.

22. The systems of claim 4, wherein the pre-oxidized ore has a P80 particle size of from about 0.5 inches to about 0.75 inches.

23. A system for the processing and recovery of metals from ores having 70% or less cyanide-soluble metal, the system comprising:
   b. a crushing segment comprising: (i) an ore comprising a metal and a sulfide; and, (ii) crushing equipment;
   b. a storage segment, the storage segment comprising an oxidizer and pH buffer material and a storage vessel configured to hold the oxidizer and pH buffer material;
   c. an oxidizing pH moderating material handling and distribution segment, the handling and distribution segment configured to receive the oxidizer and pH buffer material from the storage segment and comprising (i) the oxidizer and pH buffer material and (ii) handling and distribution equipment; wherein the handling and distribution segment is configured to meter and directly add the oxidizer and pH buffer material to the ore comprising a metal and a sulfide in the crushing segment, the handling and distribution segment, or both;
   d. the crushing segment, the handling and distribution segment, or both, configured to mix and conduct an oxidation reaction; whereby the sulfide is oxidized and thereby creating a buffered pre-oxidized ore;

e. a heap leach segment, comprising the buffered pre-oxidized ore and a reagent for extracting the metal from the buffered pre-oxidized ore, thereby forming a solution comprising the metal; and, f. a metal recovery segment, whereby the metal is recovered from the solution.

24. The system of claim 23, comprising a holding pile of buffered pre-oxidized ore, wherein the oxidation reaction continues in the holding pile.

25. The system of claim 23, wherein the buffered pre-oxidized ore has a pH of about 8 to about 10.

26. The system of claim 23, wherein the buffered pre-oxidized ore is buffered to a pH of 10.3.

27. The system of claim 23, wherein the buffered pre-oxidized ore has a total alkalinity of about 15,000 ppm to about 60,000 ppm.

* * * * *